United States Patent
Trumble et al.

(10) Patent No.: US 10,590,319 B2
(45) Date of Patent: Mar. 17, 2020

(54) HIGH PERFORMANCE, THERMALLY CONDUCTIVE SURFACE MOUNT (DIE ATTACH) ADHESIVES

(71) Applicant: NAMICS CORPORATION, Niigata-shi, Niigata (JP)

(72) Inventors: Cathy Shaw Trumble, Barrington, NH (US); Maciej Patelka, San Jose, CA (US); Noriyuki Sakai, Niigata (JP); Nicholas C. Krasco, Melrose, MA (US)

(73) Assignee: NAMICS CORPORATION, Niigata (JP)

( * ) Notice: Subject to any disclaimer, the term of this patent is extended or adjusted under 35 U.S.C. 154(b) by 74 days.

(21) Appl. No.: 15/746,954

(22) PCT Filed: Jul. 15, 2016

(86) PCT No.: PCT/JP2016/003363
§ 371 (c)(1),
(2) Date: Jan. 23, 2018

(87) PCT Pub. No.: WO2017/022191
PCT Pub. Date: Feb. 9, 2017

(65) Prior Publication Data
US 2018/0251663 A1    Sep. 6, 2018

Related U.S. Application Data

(60) Provisional application No. 62/200,333, filed on Aug. 3, 2015.

(51) Int. Cl.
| | | |
|---|---|---|
| C09J 183/04 | (2006.01) | |
| C08K 3/08 | (2006.01) | |
| C08L 83/04 | (2006.01) | |
| C08L 83/00 | (2006.01) | |
| C09J 11/04 | (2006.01) | |
| C08G 77/04 | (2006.01) | |

(52) U.S. Cl.
CPC .............. *C09J 183/04* (2013.01); *C08K 3/08* (2013.01); *C08L 83/00* (2013.01); *C08L 83/04* (2013.01); *C09J 11/04* (2013.01); *C08G 77/045* (2013.01); *C08K 2003/085* (2013.01); *C08K 2003/0806* (2013.01); *C08K 2201/003* (2013.01); *C08K 2201/014* (2013.01)

(58) Field of Classification Search
CPC . C09J 183/04; C09J 11/04; C08K 2003/0806; C08K 2003/085; C08K 2201/014; C08K 2201/003
See application file for complete search history.

(56) References Cited

U.S. PATENT DOCUMENTS

| | | | |
|---|---|---|---|
| 5,415,912 A | 5/1995 | Ushizaka et al. | |
| 5,827,921 A | 10/1998 | Osawa et al. | |
| 8,835,574 B2 | 9/2014 | Nguyen et al. | |
| 2003/0216505 A1* | 11/2003 | Akiba | C08L 83/04 524/588 |
| 2006/0194920 A1 | 8/2006 | Capote et al. | |
| 2012/0114927 A1 | 5/2012 | Khaselev et al. | |
| 2013/0266796 A1 | 10/2013 | Asada et al. | |
| 2015/0041974 A1 | 2/2015 | Kobayashi et al. | |
| 2016/0326044 A1 | 11/2016 | Dietz et al. | |

FOREIGN PATENT DOCUMENTS

| | | |
|---|---|---|
| JP | 62128162 A | 6/1987 |
| JP | 2003347322 A | 12/2003 |
| JP | 2009013294 A | 1/2009 |
| JP | 2010003848 A | 1/2010 |
| JP | 2010229560 A | 10/2010 |
| JP | 2011088947 A | 5/2011 |
| JP | 2014089818 A | 5/2014 |
| WO | 2013133085 A1 | 9/2013 |
| WO | 2014084275 A1 | 6/2014 |
| WO | 2015108205 A1 | 7/2015 |

OTHER PUBLICATIONS

International Search Report (ISR) and Written Opinion dated Oct. 18, 2016 issued in International Application No. PCT/JP2016/003363.
Extended European Search Report (EESR) dated Jan. 31, 2019 issued in counterpart European Application No. 16832477.0.

* cited by examiner

*Primary Examiner* — Kuo Liang Peng
(74) *Attorney, Agent, or Firm* — Holtz, Holtz & Volek PC

(57) ABSTRACT

A composition including (a) 20 to 85 wt % of a thermally conductive silver component containing silver nano-particles having a particle diameter of 5 to 500 nanometers; (b) a polyorgano-silsesquioxane component, the polyorganosilsesquioxane component selected from the group consisting of (i) 0.5 to 12 wt % of a polyorganosilsesquioxane fine powder, (ii) 0.5 to 8 wt % of a copolymer powder containing an interlacing polymer network of (I) a polyorganosilsesquioxane and (II) a polydiorganosiloxane; and (iii) 0.5 to 12 wt % of a combination of the polyorganosilsesquioxane fine powder and the copolymer powder; and (c) 3 to 12 wt % of a total solvent content in the form of (i) one or more solvents, (ii) a vehicle containing one or more solvents, or (iii) a combination thereof.

20 Claims, 5 Drawing Sheets

[Fig. 1]
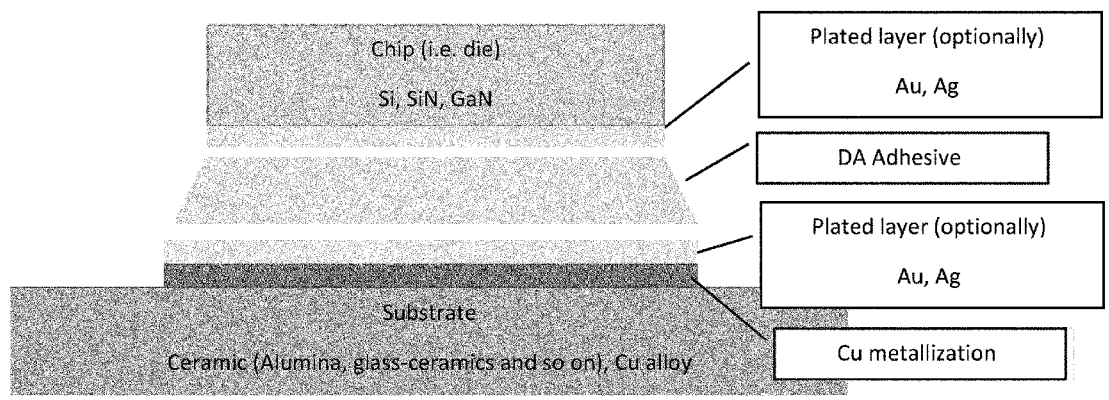
[Fig. 2]
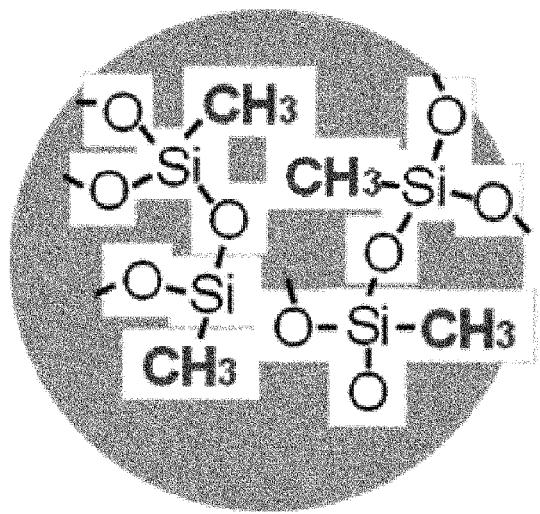

[Fig. 3]
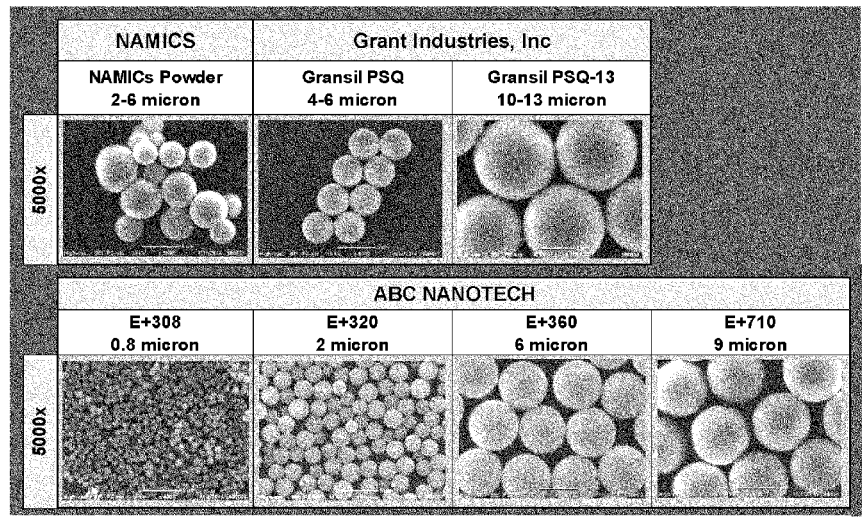
[Fig. 4]
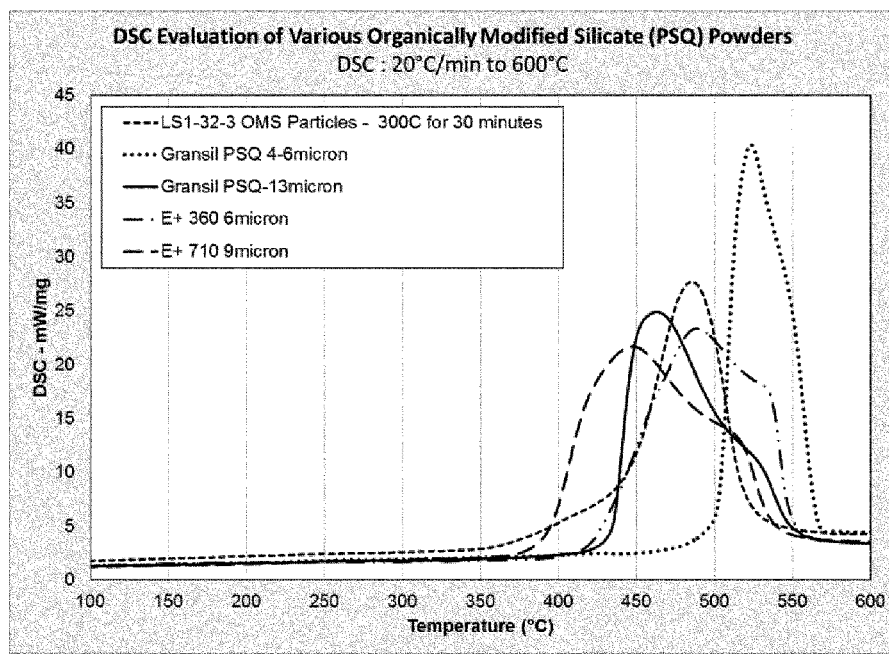

[Fig. 5]
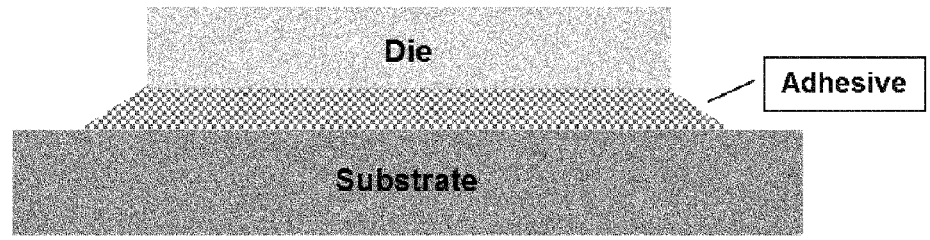
[Fig. 6a]
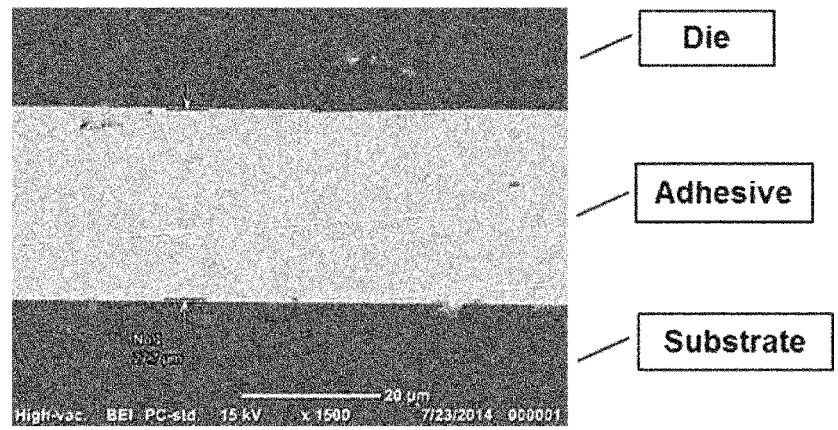
[Fig. 6b]
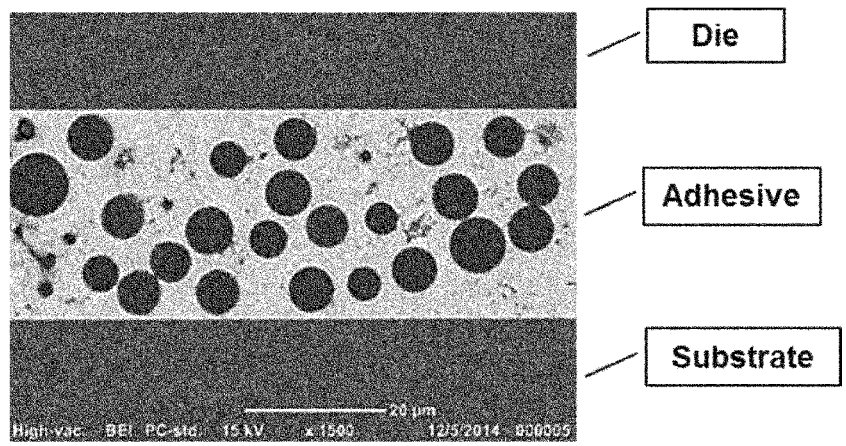

[Fig. 7]
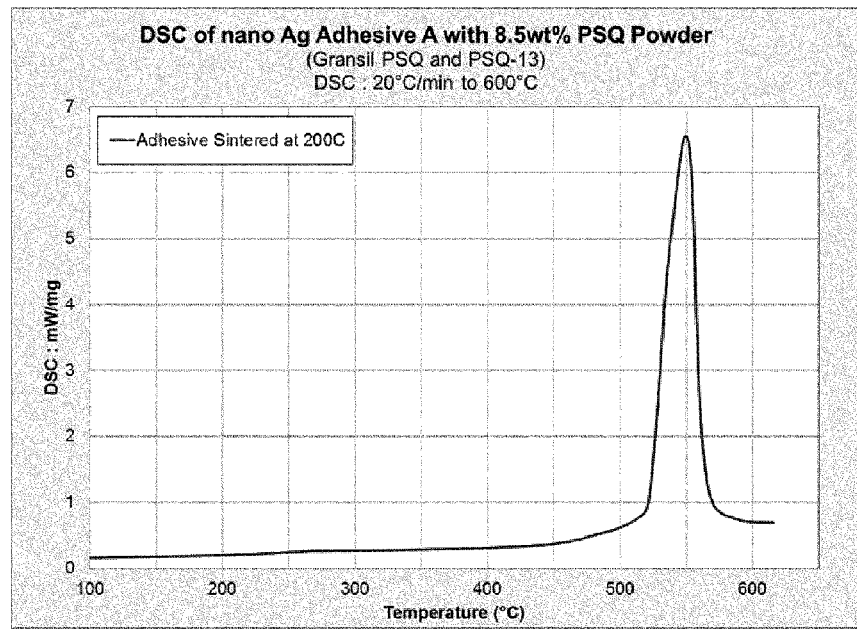
[Fig. 8]
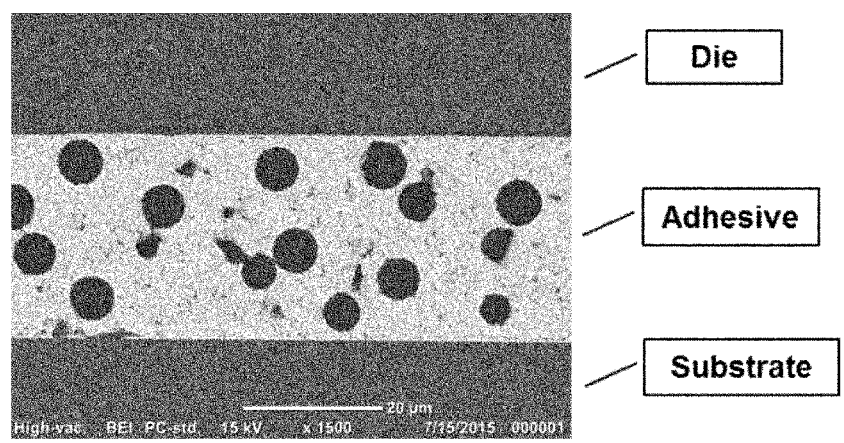

[Fig. 9]
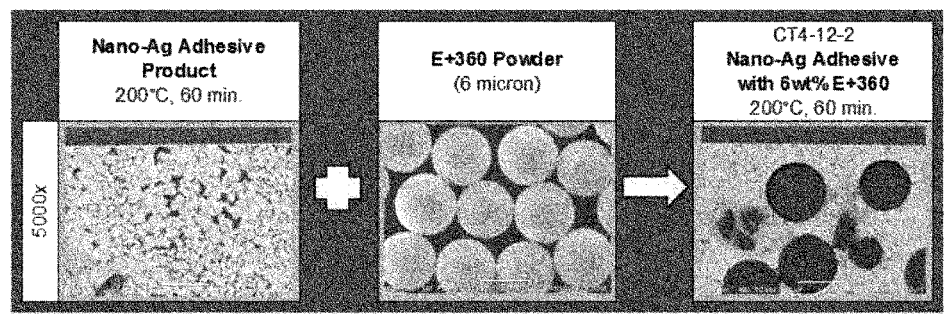
[Fig. 10]
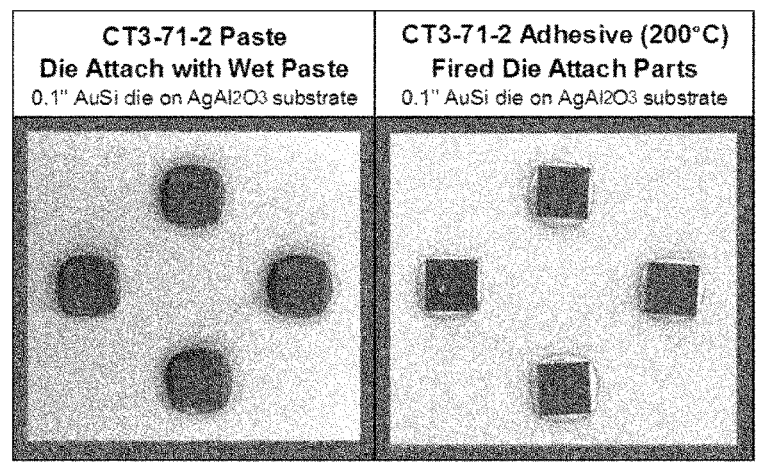

HIGH PERFORMANCE, THERMALLY CONDUCTIVE SURFACE MOUNT (DIE ATTACH) ADHESIVES

CROSS-REFERENCE TO RELATED APPLICATIONS

This application claims the priority benefit under 35 USC 119(e) of U.S. provisional application Ser. No. 62/200,333 filed Aug. 3, 2015.

BACKGROUND OF THE INVENTION

Field of the Invention

An adhesive composition containing a polyorgano-silsesquioxane powder $((R—SiO_{3/2})_n)$ and a silver powder. The adhesives are useful as a bonding member to bond components of electronic, optoelectronic, and semiconductor devices. The adhesives exhibit high performance and desirable thermal conductivity.

Background Information

Advances in the electronic, optoelectronic, and semiconductor industries have driven the need for high performance adhesives. In particular, high power devices require low-stress, high thermal conductivity, thermally stable, and moisture resistant adhesives for the manufacture of high reliability devices. Specifically, high power semiconductor devices require high thermal conductivity adhesives to efficiently drain heat from the semiconductor components (chips or dies) of the device, so that long-term performance (i.e., the functional properties) of the device does not degrade.

The manufacture of semiconductor devices typically involves attaching a semiconductor die (such as made from silicon, silicon carbide, silicon nitride, aluminum nitride or gallium nitride) to a substrate (such as a ceramic, copper, or a copper alloy), or a circuit board, using a thermally conductive adhesive. FIG. 1 illustrates a semiconductor device, wherein the underside of the die (or chip) is optionally metallized with gold or silver, and the adhesive is used as a bonding member to attach the die (or chip) to a substrate that is metallized with copper, which is optionally metallized with gold or silver. The process of attaching the semiconductor die to a substrate using an adhesive as the bonding member will be referred to hereinafter as "die attach". The adhesive layer between the die and the substrate is often referred to as the "bondline."

Adhesives that have heretofore been used for a surface mount, or die attach, generally fall into categories based on the paste formulation, the functional performance, and the use temperature. In general, silver die attach adhesives can be categorized into three types. One being a resin-type adhesive, another being a sintering-type adhesive, and the third being an inorganic silver-glass sintering-type adhesive.

A typical resin-type (organic/inorganic) die attach adhesive may contain the following:

(a) silver powders (with a diameter of about 0.5 to 50 micrometers, which are of a spherical shape, an irregular shape, or a flake shape),
(b) a thermosetting resin (e.g., an epoxy resin, an acrylic resin, a cyanate resin, and mixtures thereof),
(c) a thermoset hardener,
(d) a solvent, and
(e) optionally one or more additives (e.g., a coupling agent, a dispersing agent, or a surfactant).

A typical sintering-type die attach adhesive (which can be inorganic or organic/inorganic) may contain the following:

(a) silver nano-particles (having a diameter of 5 to 500 nanometers; which can be sintered below 350° C.),
(b) a solvent,
(c) optionally silver powders (having a diameter of about 0.2 to 20 micrometers;
(d) optionally a resin (a thermosetting resin and/or a thermoplastic resin),
(e) optionally a sintering aid (a specific dispersant may behave as a sintering aid), and
(f) optionally one or more additives (e.g., a coupling agent, a dispersant, or a surfactant).

A typical inorganic silver-glass die attach adhesive may contain the following:

(a) silver particles (having a diameter of about 0.2 to 20 micrometers),
(b) a glass frit (low melting temperature glass powder),
(c) optionally a filler (e.g., an inorganic metal oxide power),
(d) a solvent, and
(e) optionally one or more additives (e.g., a dispersant, a surfactant, or a rheological agent).

In the case of organic/inorganic adhesives, there are functional limitations due to the chemical make-up of the adhesive. For example, the organic components (e.g., epoxy and thermoplastic materials) have temperature limitations due to the decomposition of the organic material. Typical die attach adhesives that contain epoxy and/or thermoplastic components have been reported to have a maximum use temperatures of 200° C. to 225° C. These adhesives exhibit degradation in properties (such as a high temperature die shear strength), when manufactured devices are exposed to additional processing steps such as a high temperature solder (e.g., Pb-free SAC305, or gold-tin solder) reflow temperatures of 250° C. to 320° C. These adhesives also show degradation in performance when exposed to high use temperatures (e.g., >200° C.) for a long-term use. Degradation of the adhesive, especially formation of cracks or degradation of functional properties (e.g., thermal conductivity), results in decreased performance of the manufactured semiconductor device.

In addition to temperature limitations, organic/inorganic adhesives often have a trade-off between achieving a low modulus adhesive (low-stress) and resistance to moisture attack, where the organic component of the paste component typically is most susceptible to moisture attack. Also, low modulus adhesives of this type tend to have a significantly lower thermal conductivity due to the high polymer resin content. All of these factors lead to problems with respect to the long-term reliability for high temperature (high power), high performance devices.

There are times, however, when organic/inorganic adhesives are desirable. For example, when die attach applications use a bare (no metallization) die and/or a bare substrate, an organic component is often used in the adhesive formulation to achieve good adhesion. For some applications, such as those that do not require high temperature operation, use of bare die attach components can result in cost savings with respect to the manufacture of the device. In addition, if the silver powder component of the paste formulation does not sinter below the typical processing temperatures (i.e., ≤200° C.) of the adhesive, organic components are added to the paste formulation to meet the functional requirements of the adhesive.

Adhesives that are primarily inorganic in composition, such as the sintering-type of adhesives, display excellent properties regarding thermal conductivity and thermal stability; however, storage modulus values are typically high. High storage modulus adhesives are typically not suitable for large die applications, or applications where there is a large thermal expansion mismatch between the die and substrate, due to a high stress at the adhesive bondline. Organic components can be added to the sintering-type adhesives to modify the functional properties, such as decreasing the storage modulus for lower stress bondlines.

In the case of thermally conductive silver-glass composites, U.S. provisional patent application Ser. No. 61/928,533 filed on Jan. 17, 2014, entitled "CONDUCTIVE PASTE AND METHOD FOR PRODUCING A SEMICONDUCTOR DEVICE USING THE SAME", inventors Raymond Dietz et al. (WO 2015/108205) was directed to a thermally conductive metal and low melting temperature glass frit (powder) blended together with a solvent system (a vehicle) to make a die attach adhesive for high temperature applications (e.g., up to a 300° C. continuous use temperature). This type of adhesive formulation is robust at elevated temperature use, and performs well with respect to reliability testing of a silicon carbide die bonded to a silver metallized alumina substrate. The silver-glass adhesives also show excellent performance when used to bond a bare die and a bare substrate together during the manufacture of the die attach device.

While silver-glass adhesives show superior performance up to a 300° C. use temperature, the processing temperature for the adhesive is about 370° C., which is too high for some temperature sensitive electronic devices or packages. In addition, the storage modulus for silver-glass composite adhesives is quite high, due to the rigid, brittle nature of glass and glass ceramic materials. For this reason, such adhesive is not suitable for large die applications or applications where there is a large thermal expansion mismatch between the die and the substrate, due to a high stress at the adhesive bondline.

Metal and metal-alloy solders are another option for surface mount (die attach) solders. Lead-based solders are being replaced by lead-free solder options, such as SAC305 solder, for a lead-free assembly of electronic components and devices. SAC305 solder is commonly used in industry as a lead-free solder replacement for lead-based solders; and often uses a flux for the soldering process, which can result in a post-soldering residue on the components. In addition, the SAC305 solder requires processing temperatures in the range of 250 to 270° C., with common wave soldering processes requiring about 265° C. Reliability testing with SAC305 solder has shown problems with the formation of intermetallic phase(s) at interfaces, which contribute to problems with reliability testing of soldered components and devices.

High temperature gold-based solders, such as gold, gold-tin, gold-silicon, and gold-germanium, are used for various die attach applications that require high temperature performance. Stamped solder preforms are often used in surface mount applications to eliminate the need for flux during the soldering process; however, a low oxygen atmosphere (such as nitrogen, or a mixture of nitrogen and hydrogen) is required for the soldering process. Gold-based solders require processing temperatures greater than 280° C., and the thermal profile for a gold-tin solder, which is used for die attach applications, can reach 320° C. for short times, with an addition of external pressure applied on the die attach part during processing to achieve satisfactory die attach bondline and interfaces. Gold-tin solders exhibit a modest thermal conductivity of about 57 W/mK.

Polymethylsilsesquioxane powders, $(CH_3-SiO_{3/2})_n$, are commonly used in the cosmetic industry, and are commercially available in a wide range of particle sizes of interest for use in die attach adhesives (e.g. 0.8 to 20 micrometers). FIG. 2 is a schematic of a polymethylsilsesquioxane particle, wherein siloxane bonds have formed to create a 3-dimensional network; the methyl groups are not cross-linked, which result in a low modulus material. Polymethylsilsesquioxane fine powders are commercially available, with products from companies such as Grant Industries, Inc., Elmwood Park, N.J. and ABC NANOTECH, Daejeon, Korea (see the scanning electron images of FIG. 3). While these fine powders differ in particle size, the physical properties are similar, as shown in Table 1.

TABLE 1

Appearance and properties of polymethylsilsesquioxane powder

| Appearance | white powder |
| --- | --- |
| Refractive Index | 1.43 |
| Density (g/cc) | 1.3 |
| Melting Point | >999° C. |

The polymethylsilsesquioxane powder data sheets from ABC NANOTECH also show data which indicate exceptional thermal stability of the fine powders. This property was confirmed as shown in FIG. 4, wherein a thermal analysis of the powders (using a differential scanning calorimetry) shows decomposition of the methyl groups (exothermic peak) at temperatures >350° C.

In addition, polymethylsilsesquioxane materials do not melt or flow (there is no glass transition temperature (Tg)) in the temperature range of interest (−55° C. to 350° C.) for many die attach applications. Therefore, "re-melting" of the material at elevated temperatures or during thermal cycling of the device is not a concern. Also, since there is no Tg in the temperature range of interest, there are no rapid changes in properties, such as storage modulus or thermal expansion, that are typically observed for many epoxy and polymer (e.g., thermoplastic) materials.

U.S. Pat. No. 8,835,574 to Nguyen et al. is directed to adhesive compositions for use in die attach applications. Column 18, line 25 of U.S. Pat. No. 8,835,574 discloses that polymethylsilsesquioxane powder can be used as a filler in the Nguyen et al. adhesive composition.

JP S62-128162 concerns an epoxy resin composition for encapsulating a semiconductor. The composition contains the following:
 (a) an epoxy resin,
 (b) a hardener,
 (c) a silicone powder described as $(RSiO_{3/2})n$, and
 (d) a silicone oil In JP S62-128162, it is stated that the composition serves to reduce the stress of a semiconductor device.

JP 2003-347322 is directed to a die-attach paste which contains a thermosetting resin and a polyorganosilsesquioxane powder. This is an insulating paste and does not contain silver powder.

JP 2009-013294 describes the use of silver flakes ("A1") or spherical polyorganosilsesquioxane powder ("A2") as a filler for a die attach adhesive (see paragraphs[0194] et seq.). However, silver flakes and polyorganosilsesquioxane powder are not simultaneously used in the same paste (see Table 1).

JP 2010-003848 discloses die attach adhesives for an LED containing polyorganosilsesquioxane powders.

U.S. Pat. No. 5,415,912 concerns a pressure sensitive adhesive (an adhesive tape) that contains polyorganosilsesquioxane fine particles.

U.S. Pat. No. 5,827,921 relates to a silicone-based material containing a component comprising colloidal silica or polyorganosilsesquioxane material.

US 2012/0114927 and US 2013/0266796 deal with Nano-Ag adhesives and thermal bonding adhesives, respectively.

SUMMARY OF THE INVENTION

The present invention relates to a high performance, thermally conductive surface mount (e.g., die attach) adhesive that can be used for high temperature, high power, and high reliability applications in various industries including the electronics, automotive and aerospace industries. For applications that do not require high temperature operation or that prefer the use of bare (not metallized) die attach components, adhesive formulations are provided that optimize functional performance, reliability, and cost for the manufactured device. Advantages of the adhesive composition include one or more of the following:

(a) thermal processing temperatures ranging from about 150° C. to 400° C., (b) a low stress adhesive having a low modulus and a low coefficient of thermal expansion, (c) excellent thermal properties such as a high thermal conductivity and having a low interfacial resistance value, (d) excellent adhesion properties such as a desirable high temperature adhesion, (e) high temperature stability, (f) excellent resistance to moisture, and (g) suitability for dispensing applications (small dot), and fine pitch screen printing applications.

Unless otherwise specified, the wt % set forth hereinafter are with respect to the entire adhesive paste formulation.

In an embodiment, an adhesive composition is provided which contains the following:

(a) a thermally conductive silver component selected from the group consisting of (i) silver nano-particles having a particle diameter of 5 to 500 nanometers, which can be sintered below 350° C., (ii) a silver powder having a diameter of about 0.5 to 50 micrometers, and having a spherical shape, an irregular shape, or a flake shape, and (iii) a combination of the silver nano-particles and the silver powder;

(b) optionally copper particles having a diameter of about 0.5 to 50 micrometers, and having a spherical shape, an irregular shape, or a flake shape;

(c) optionally silver coated copper particles, having a diameter of about 0.5 to 50 microns, and having a spherical shape, an irregular shape, or a flake shape;

(d) a polyorganosilsesquioxane component selected from the group consisting of (i) a polyorganosilsesquioxane fine powder, (ii) a copolymer powder containing an interlacing polymer network of (I) a polyorganosilsesquioxane and (II) a polydiorganosiloxane, and (iii) a combination of the polyorganosilsesquioxane fine powder and the copolymer powder;

(e) optionally a resin (a thermosetting resin and/or a thermoplastic resin);

(f) one or more solvents, a vehicle containing one or more solvents, or a combination thereof; and (g) optionally one or more additives (e.g., a coupling agent, a dispersing agent, or a surfactant).

In a further embodiment, a high performance resin-free adhesive composition is provided which comprises the following components:

(a) a thermally conductive silver nano-particle component preferably comprising 20 to 85 wt % of silver nano-particles having a particle diameter of 5 to 500 nanometers, which can be sintered below 350° C.;

(b) 0 to 70 wt % of a silver powder;

(c) a polyorganosilsesquioxane component selected from the group consisting of (i) 0.5 to 12 wt % of a polyorganosilsesquioxane fine powder, (ii) 0.5 to 8 wt % of a copolymer powder containing an interlacing polymer network of (I) a polyorganosilsesquioxane and (II) a polydiorganosiloxane, and (iii) 0.5 to 12 wt % of a combination of the polyorganosilsesquioxane fine powder and the copolymer powder;

(d) 3 to 12 wt % of a total solvent content in one or more solvents, a vehicle containing one or more solvents, or a combination thereof;

(e) 0 to 1 wt % of one or more dispersants; and (f) 0 to 0.5 wt % of one or more surfactants.

In a further embodiment, a first adhesive composition (resin-free composition) is provided which contains the following: (a) 20 to 85 wt % of a thermally conductive silver component containing silver nano-particles having a particle diameter of 5 to 500 nanometers (which can be sintered below 350° C.); (b) a polyorganosilsesquioxane component, the polyorganosilsesquioxane component being selected from the group consisting of (i) 0.5 to 12 wt % of a polyorgano-silsesquioxane fine powder, (ii) 0.5 to 8 wt % of a copolymer powder containing an interlacing polymer network of (I) a polyorganosilsesquioxane and (II) a polydiorgano-siloxane and (iii) 0.5 to 12 wt % of a combination of the polyorgano-silsesquioxane fine powder and the copolymer powder; (c) 3 to 12 wt % of a total solvent content in one or more solvents, a vehicle containing one or more solvents, or a combination thereof; (d) 0 to 1 wt % of one or more dispersants; and (e) 0 to 0.5 wt % of one or more surfactants.

In yet another embodiment, a second adhesive composition (resin containing composition) is provided which contains the following:

(a) a thermally conductive silver component selected from the group consisting of (i) 0.5 to 85 wt % of silver nano-particles having a particle diameter of 5 to 500 nanometers (which can be sintered below 350° C.), (ii) 0.5 to 86 wt % of a silver powder having a diameter of about 0.5 to 50 micrometers (and having a spherical shape, an irregular shape, or a flake shape), and (iii) 60 to 85 wt % of a combination of the silver nano-particles and the silver powder;

(b) a polyorganosilsesquioxane component selected from the group consisting of (i) 0.5 to 12 wt % of a polyorgano-silsesquioxane fine powder, (ii) 0.5 to 8 wt % of a copolymer powder containing an interlacing polymer network of (I) a polyorganosilsesquioxane and (II) a polydiorganosiloxane and (iii) 0.5 to 12 wt % of a combination of the polyorgano-silsesquioxane fine powder and the copolymer powder;

(c) 0.5 to 14 wt % of a resin selected from the group consisting of (i) a thermosetting resin component comprising a thermosetting resin, (ii) a thermoplastic resin, and (iii) a combination of the thermosetting resin component and the thermoplastic resin;

(d) 3 to 12 wt % of a total solvent content in one or more solvents, a vehicle containing one or more solvents, or a combination thereof;

(e) 0 to 1 wt % of one or more dispersants; and (f) 0 to 0.5 wt % of one or more surfactants.

In a further embodiment, an article is provided which includes a top bonding component (e.g., a ceramic die, a glass die, or a metal die, wherein the die may be a semiconductor), a bottom bonding component or a substrate (such as a ceramic (for example, alumina), copper, a copper alloy, or a circuit board) and an adhesive which binds the top bonding component to the substrate, wherein the adhesive is the aforesaid first adhesive composition or the aforesaid second adhesive composition. The top bonding component and/or the substrate may be metallized (typically gold or silver) or non-metallized (bare).

In still another embodiment, a method is provided for reducing the storage modulus of a thermally conductive adhesive containing silver and a solvent, the method comprising blending the adhesive with a polyorganosilsesquioxane component selected from the group consisting of (i) 0.5 to 12 wt % of a polyorgano-silsesquioxane fine powder, (ii) 0.5 to 8 wt % of a copolymer powder containing an interlacing polymer network of (I) a polyorganosilsesquioxane and (II) a polydiorganosiloxane, and (iii) 0.5 to 12 wt % of a combination of said polyorgano-silsesquioxane fine powder and said copolymer powder, wherein the wt % of the polyorganosilsesquioxane component is based on the combined amounts of the thermally conductive adhesive and the polyorganosilsesquioxane component. The thermally conductive adhesive may be a resin-type, a sintering-type, or an inorganic silver-glass sintering-type. A solvent (which may be the same or different from the solvent in the thermally conductive adhesive) may be added to adjust the paste rheology for adhesive paste dispensing or adhesive paste screen printing applications.

In yet a further embodiment, an article is provided which includes a top bonding component (e.g., a ceramic die, a glass die, or a metal die, wherein the die may be a semiconductor), a bottom bonding component or substrate (such as a ceramic (for example, alumina), copper, a copper alloy, or a circuit board) and an adhesive which binds the top bonding component to the substrate, wherein the adhesive is the aforesaid thermally conductive adhesive that has been blended with a polyorgano-silsesquioxane component. The top bonding component and/or the substrate may be metallized (typically gold or silver) or non-metallized (bare).

BRIEF DESCRIPTION OF DRAWINGS

The accompanying figures, where like reference numerals refer to identical or functionally similar elements throughout the separate views, and which together with the detailed description below are incorporated in and from part of the specification, serve to further illustrate various embodiments and to explain various principles and advantages all in accordance with the present invention.

FIG. 1 is a schematic representation of a semiconductor device (die or chip) bonded to a substrate using a die attach ("DA") adhesive.

FIG. 2 is a schematic representation of a polyorgano-silsesquioxane particle wherein the R in $(R-SiO_{3/2})_n$ is a methyl group ($CH_3$). Siloxane bonds are created to form a 3-dimensional network, to form spheres of a low-modulus silicone resin powder.

FIG. 3 shows scanning electron images of various polymethyl-silsesquioxane fine powders that are commercially available. The fine powders are comprised of spherical particles that are available in a wide range of particle sizes, with narrow particle size distribution.

FIG. 4 is a graph which shows a thermal analysis for various polymethylsilsesquioxane fine powders (as shown in FIG. 3) using differential scanning calorimetry. The polymethyl-silsesquioxane fine powders exhibited excellent thermal stability, with decomposition of the methyl groups ($CH_3$) observed above about 350° C. (exothermic peak).

FIG. 5 is a sectional elevation view of a die attach part containing a high performance adhesive according to an embodiment of the invention.

FIGS. 6a and 6b are sectional scanning electron images of a manufactured die attach part prepared respectively with (a) a resin-free thermally conductive silver adhesive and (b) a resin-free thermally conductive silver adhesive that contains polymethyl-silsesquioxane fine powder.

FIG. 7 is a graph which shows a thermal analysis (differential scanning calorimetry) of a resin-free thermally conductive silver adhesive that contains polymethylsilsesquioxane fine powder (adhesive paste formulation 8 hereinbelow), and was fired to 200° C. The adhesive exhibited excellent thermal stability, with decomposition of the methyl groups ($CH_3$) from the polymethylsilsesquioxane component observed above about 450° C. (exothermic peak).

FIG. 8 is a sectional scanning electron image of a manufactured die attach part prepared with a thermally conductive silver adhesive containing an epoxy resin, a thermoplastic resin, and polymethylsilsesquioxane fine powder.

FIG. 9 are scanning electron images which illustrate the process of adding polymethylsilsesquioxane fine powder to a sintering-type adhesive; parts were fired at 200° C. The scanning electron images show that the polymethylsilsesquioxane fine powder is well dispersed in the adhesive microstructure and that the dense silver microstructure, and excellent interfacial bonding, of the commercial adhesive are preserved.

FIG. 10 are photographs which show the results of a die attach "bleed" test using a resin-free thermally conductive silver adhesive that contains polymethylsilsesquioxane fine powder, and was fired to 200° C. A vehicle bleed ring was observed after placing the die on the substrate; however, after the firing process no bleed ring, or paste residue was observed around the die.

Persons of ordinary skill in the art will appreciate that elements in the figures are illustrated for simplicity and clarity and have not necessarily been drawn to scale. For example, the dimensions of some of the elements in the figures may be exaggerated relative to other elements to help to improve understanding of the embodiments of the present invention.

DETAILED DESCRIPTION OF THE INVENTION

The die attach adhesive composition can be processed over a wide range of temperature in air, or an inert (e.g., nitrogen) atmosphere. The wide processing temperature range allows for diverse performance properties and device applications.

FIG. 5 is a sectional elevation view of a die attach part using a high performance adhesive according to an embodiment of the invention. The part consists of a die bonded to a substrate with an adhesive. The adhesive bondline and fillet is controlled by the amount of adhesive paste that is used, and the pressure that is applied during placement of the die. The die does not require applied pressure during processing (sintering) of the manufactured die attach part.

A polyorganosilsesquioxane fine powder, a copolymer powder containing an interlacing polymer network of polyorgano-silsesquioxane and a polydiorqanosiloxane, or combination of the two, can be added to the three categories of die attach adhesives discussed hereinabove (i.e., a resin-type, a sinteringtype, or a silver-glass type) to modify the functional properties thereof. In particular, polymethylsilsesquioxane additions to the three categories of adhesives, mentioned hereinabove, can result in decreasing the storage modulus of the adhesive. Adhesive paste formulations can be prepared by blending the polymethylsilsesquioxane powder component with a thermally conductive paste, or by preparing adhesive paste formulations using the individual paste components.

Principal components of the adhesive paste formulations of the present invention are described below, and as an integral part of a unique adhesive paste system which provides unexpected adhesive performance.

Thermally Conductive Component

The thermally conductive component includes either silver nano-particles, a silver powder, or silver nano-particles combined with a thermally conductive powder that may include a silver powder, a copper powder, a silver coated copper powder, or a combination thereof. In a preferred embodiment, the chemical makeup of the thermally conductive components are substantially the same (i.e., silver), but they differ in physical properties.

The thermally conductive component is added in the form of (i) 0.5 to 85 wt % of silver nano-particles having a particle diameter of 5 to 500 nanometers, which can be sintered below 350° C., (ii) 0.5 to 86 wt % of a silver powder containing particles, having a diameter of about 0.5 to 50 micrometers, and having a spherical shape, an irregular shape, or a flake shape, or (iii) 60 to 85 wt % of a combination of the silver nano-particles and the silver powder. Preferably the combination of the silver nano-particles and the silver powder content is 75 to 85 wt %.

Such silver nano-particles can be produced according to US 2015/0041974 A1, the entire contents of which are incorporated by references herein. Preferably the silver nano-particles have an average diameter of 40 to 350 nanometers, and can be sintered by heating to a temperature below 350° C., for example, from 130° C. to 320° C. The preferred content of the silver nano-particles in the resin-free adhesive paste formulation is 20 to 70 wt %, and is most preferably 30 to 60 wt % of the adhesive paste formulation.

Preferably the silver powder particle size is 0.5 to 20 micrometers, and most preferably it is 0.5 to 5 micrometers. The preferred silver powder content in the resin-free adhesive paste formulation (i.e., in combination with the nano-silver particles) is 20 to 70 wt %, and most preferably it is 30 to 60 wt %. The preferred silver powder content in the resin containing adhesive paste formulations is 30 to 86 wt %, and the most preferred silver powder content is 65 to 86 wt % (with no nano-silver particles present). The composition containing such silver powder content can be processed at a temperature below 200° C.

While silver is the preferred thermally conductive filler powder, copper and/or silver coated copper powders can be partially substituted for the silver nano-particles, the silver powder, or a combination thereof, in the amount of 1 to 50 wt %, and preferably in the about of 5 to 15 wt %. Combinations of silver, copper, or silver coated copper powders can be used to optimize the functional properties for a specific die attach application.

Polyorganosilsesquioxane Fine Powder and Copolymer Powder

Polyorganosilsesquioxane particles have a three dimensional structure that contains (R—SiO3/2)n, wherein the organic group (R) can be methyl, ethyl, propyl, butyl, cycloalkyl, vinyl, phenol, epoxy, or amino. The methyl organic group is preferred, wherein the polyorganosilsesquioxane, e.g., polymethylsilsesquioxane, fine powder is preferably contained in an amount of between 2 and 10 wt %, and more preferably contained in an amount between 4 and 9 wt %. The polyorganosilsesquioxane, e.g., polymethyl-silsesquioxane, particle size ranges from 0.8 to 20 micrometers, with a preferred particle size range of 3 to 10 micrometers. For die attach applications that have a large bondline thickness, such as 50 to 100 micrometers, a 5 to 10 micrometer particle size range is most preferred. For die attach applications that have a small bondline thickness, such as 10 to 25 micrometers, a 3 to 6 micrometer particle size range is most preferred. In addition, various particle size powders can be blended to optimize functional properties for a specific adhesive application. When using two particle size powders, the preferred ratio of powders is 50:50. When using three different particle size powders, the preferred ratio of the powders is 50:30:20, from the largest to the smallest particle size diameter.

A copolymer powder can be added in an amount of 0 to 8 wt % of the adhesive paste formulation, wherein the particle/agglomerate size ranges from 2 to 50 micrometers, and the preferred particle/agglomerate size is 5 to 20 micrometers. The copolymer contains an interlacing polymer network of (i) a polyorganosilsesquioxane ((R—SiO$_{3/2}$)$_n$) and (ii) a polydi-organosiloxane ((R$_2$—SiO)$_n$), wherein the organic group (R) can be methyl, ethyl, propyl, butyl, cycloalkyl, vinyl, phenol, epoxy, or amino. The methyl organic group is preferred, wherein the polymethylsilsesquioxane/polydimethylsiloxane copolymer powder (e.g., Gransil EPSQ from Grant Industries, Inc., Elmwood Park, N.J.) comprises 0 to 8 wt % of the adhesive paste formulation, with the preferred content being 1 to 5 wt % of the adhesive paste formulation.

In the copolymer, the weight ratio of the polydiorganosiloxane to the polyorganosilsesquioxane is 1 to 50, and preferably 20 to 40.

The combination of the polyorganosilsesquioxane fine powder and the copolymer powder ranges from 0.5 to 12 wt %, with the preferred content being 2 to 10 wt %.

Resin: Thermosetting Resin and Thermoplastic Resin

A resin-type or sintering-type adhesive can be prepared by adding a polyorganosilsesquioxane fine powder as described above, a copolymer powder as described above, or combinations thereof, to an adhesive paste formulation that contains a resin (a thermosetting resin component and/or a thermoplastic resin).

A thermosetting resin component principally comprises a thermosetting resin, and additionally may be provided with, or require the addition of a curing catalyst/hardener. The thermosetting resin component will be referred to hereinafter as the "thermosetting resin", wherein the catalyst/hardener that promotes curing the polymer material (i.e., promotes crosslinking of the polymer) is present. The content of the thermosetting resin can vary from 0.5 to 10 wt % of the adhesive paste formulation, with the preferred thermosetting resin content ranging from 4 to 8 wt % of the adhesive paste formulation.

A wide variety of known thermosetting resins can be used in the present invention, and will be selected depending on the functional requirements of the cured material. A curing catalyst/hardener is added to the liquid thermosetting resin to promote curing (crosslinking) of the thermosetting resin material. The catalyst/hardener which is incorporated in the liquid thermosetting resin should be latent, that is, is activated at temperatures greater than about 100° C. Curing catalysts/hardeners for use with liquid thermosetting resins may be selected based on the desired functional and processing properties of the thermosetting material. Various types of catalysts/hardeners can be used, including a blocked acid catalyst type, an organometallic catalyst type, and a photo-initiator catalyst type. Preferred thermosetting resins include bisphenol A type, bisphenol F type, phenol novolak type, alicyclic type, glycidyl ester type and cycloaliphatic type epoxy. In addition, the thermosetting resins may have a latent catalyst/hardener already mixed in the liquid resin.

The thermoplastic resin for use in the present invention will be selected depending on the functional requirements of the sintered adhesive. The thermoplastic content can vary from 0.5 to 10 wt % of the adhesive paste formulation, with the preferred thermoset resin content ranging from 4 to 7 wt %. Preferred thermoplastic resins include a polyester type, a polyurethane type, a polyamide type, and a phenoxy resin type thermoplastic.

The thermosetting resin can be used in combination with the thermoplastic resin to optimize the functional properties for a specific die attach application. The combined content of the thermosetting resin and the thermoplastic resin can vary from 1 to 14 wt %, with the preferred content ranging from 4 to 10 wt %. In this case, the most preferred range depends on the desired functional properties for the die attach application.

Vehicle: Solvent, Dispersant and Surfactant

Various organic components can be added to the adhesive paste formulation to adjust the rheology of the paste, act as a sintering aid, or to alter the surface tension or the vapor pressure of the resulting adhesive paste formulation. When organic components such as one or more solvents and one or more dispersants, and/or one or more surfactants are blended together the resulting mixture is referred to as a "vehicle". The compositions herein contain 3 to 12 wt % of a total solvent content in (i) one or more solvents, (ii) a vehicle containing one or more solvents, or (iii) a combination thereof. In an embodiment of the invention, an example of a vehicle formulation for an adhesive paste composition is shown in Table 2 hereinbelow.

A solvent used in a high performance paste formulation is preferably characterized by the following general properties:

(a) non-reactive with the silicone resin powder (e.g., a polymethylsilsesquioxane and a copolymer powder as described hereinabove), e.g., does not dissolve the resin or causes a large swelling of the particles;

(b) displays low bleed characteristics, i.e., a slightly polar solvent with some surface tension is desirable to minimize bleeding at the edge of the die attach fillet; and (c) a moderate vapor pressure, i.e., a solvent that can be largely extracted from the matrix with elevated temperatures within a practical time.

Within these parameters a wide variety of solvents can be used, including, for example, alcohols, acetates, ethers, esters and ketones. Examples of such solvents include terpineol, ester alcohol (such as Texanol™), 2-ethyl-1,3-hexanediol, 2-phenoxy ethanol, dihydroterpineol, benzyl alcohol, and butyl Carbitol™ acetate; solvents can be used alone, or in combination to achieve the desired properties. The preferred solvents for adhesive paste formulations include 2-ethyl-1,3-hexanediol, benzyl alcohol, and butyl Carbitol™ acetate.

The total solvent content in one or more solvents, a vehicle containing one or more solvents, or a combination thereof can vary from 3 to 12 wt % of the adhesive paste formulation, with the preferred solvent content (or vehicle content) ranging from 5 to 9 wt %. The most preferred solvent content (or vehicle content) depends on the paste application method, wherein a paste dispensed through a syringe, or a screen printing of the paste to form a pattern on a substrate often have different viscosity/rheological requirements.

Additional organic components may be added to adjust the properties of the adhesive paste formulation. For example, a dispersant may be added in an amount of up to 1 wt % of the adhesive paste formulation to assist with the dispersion of the adhesive paste components and to aid in the sintering of the adhesive. In an embodiment of the invention, the dispersant BYK111 (D. N. Lukens Inc., Westboro, Mass.) was used in the adhesive paste formulation. Surfactants can also be added, such as in an amount of up to 0.5 wt %. In general, the purpose of a surfactant is to alter the surface tension of the resultant adhesive paste formulations. In an embodiment of the invention, the surfactant FC4432 (3M Center, St. Paul, Minn.) was used in the adhesive paste formulation.

Die Attach Parts

FIGS. 6a and 6b are sectional scanning electron images of die attach parts prepared respectively with (a) a resin-free thermally conductive silver adhesive (adhesive paste formulation 1 hereinbelow) and (b) a resin-free thermally conductive silver adhesive (adhesive paste formulation 7 hereinbelow) that contains polymethyl-silsesquioxane fine powder. FIG. 6a shows a very dense silver microstructure, with an excellent interfacial bonding at the die and substrate interfaces. FIG. 6b shows the impact of adding polymethylsilsesquioxane fine powder to a resin-free silver adhesive, wherein the polymethylsilsesquioxane particles are well dispersed throughout the silver adhesive and dense regions (pathways) of high thermally conductive silver adhesive are formed; and wherein the resulting interfacial bonding remains excellent.

FIG. 8 is a sectional scanning electron image of a die attach part prepared with a thermally conductive silver adhesive that contains polymethylsilsesquioxane fine powder, a thermo-setting resin, and a thermoplastic resin component (adhesive paste formulation 46 hereinbelow). FIG. 8 shows a dense silver microstructure, wherein the polymethyl-silsesquioxane particles, the thermosetting resin, and the thermoplastic resin are well dispersed throughout the silver adhesive, and dense regions of high thermally conductive silver adhesive are formed; and wherein the resulting interfacial bonding remains excellent.

EXAMPLES

Example 1: Preparation of Adhesive Paste Formulations 1 to 29

The adhesive paste formulations 1 to 29 were prepared using the vehicle formulation set forth in Table 2 and having the compositions set forth in Table 3. The formulations in Table 3 do not contain thermosetting resin or thermoplastic resin components, and therefore are considered "resin-free"; that is they are resin-free sintering-type adhesives.

The nano-silver paste ("NAMICS") referred to in Table 3 is produced by Namics Corporation, Niigata-shi, Japan and is characterized as follows:

A conductive paste that contains 90 wt % of silver fine particles which have an average particle diameter of 100 nm and have a crystallite diameter of 40 nm, combined with 2 wt % amine acetate and 8 wt % solvent (2-ethyl-1,3-hexanediol).

The adhesive paste preparation involved the following:

(a) if any of the dry components have particle agglomerates, shear mixing was used to break-up said particle agglomerates;

(b) weighing out the appropriate amount of each component based on the adhesive paste formulation in weight percent;

(c) paste components were first blended by hand until all the dry components were mixed in;

(d) the blended paste components were then blended and de-aired using a Thinky Planetary Centrifugal mixer;

(e) if needed, paste viscosity adjustments were made by adding an additional solvent, such as 2-ethyl-1,3-hexanediol;

(f) the paste was either used immediately or stored at −40° C. for future use;

(g) if stored at −40° C., the paste was thawed to room temperature prior to be used for parts preparation.

TABLE 2

Vehicle formulation used in the preparation of the adhesive paste formulations

| Vehicle Formulation | wt % |
|---|---|
| 2-Ethyl-1,3-hexanediol | 72.9 |
| Butyl Carbitol ™ Acetate (BCA) | 24.3 |
| Dispersant - BYK111 | 2.4 |
| Surfactant - FC4432 | 0.3 |

TABLE 3

Adhesive paste formulations and functional properties for adhesive paste formulations 1 to 29

| | 1 wt % | 2 wt % | 3 wt % | 4 wt % | 5 wt % | 6 wt % | 7 wt % | 8 wt % | 9 wt % | 10 wt % |
|---|---|---|---|---|---|---|---|---|---|---|
| MATERALS | | | | | | | | | | |
| Nano-silver paste (NAMICS) | 56.6 | 56.3 | 55.6 | 54.5 | 53.3 | 53.1 | 52.2 | 51.2 | 49.2 | 49.2 |
| Silver Powder (1 μm $D_{50}$) | 37.7 | 37.6 | 36.9 | 36.4 | 35.5 | 35.3 | 34.7 | 34.2 | 32.7 | 32.7 |
| Silver Powder (4.8 μm $D_{50}$) | | | | | | | | | | |
| Silver Flake (4.4 μm $D_{50}$) | | | | | | | | | | |
| 2-Ethyl-1,3-hexandiol | | | | | | | | | | |
| Vehicle (Table 2) | 5.7 | 5.6 | 5.6 | 5.5 | 6.2 | 6.2 | 6.1 | 6.0 | 6.1 | 6.1 |
| Gransil PSQ Powder | | 0.5 | 1.9 | 3.6 | | 2.7 | 3.5 | 4.3 | 6.0 | |
| Gransil PSQ-13 Powder | | | | | 5.0 | 2.7 | 3.5 | 4.3 | 6.0 | |
| E+ 710 Powder | | | | | | | | | | 6.0 |
| E+ 360 Powder | | | | | | | | | | 6.0 |
| E+ 320 Powder | | | | | | | | | | |
| E+ 308 Powder | | | | | | | | | | |
| Co-polymer EPSQ | | | | | | | | | | |
| Processing Temperature (° C.) | 200 | 200 | 200 | 200 | 200 | 200 | 200 | 200 | 200 | 200 |
| Processing Atmosphere | air | air | air | air | air | air | air | air | air | air |
| PROPERTIES | | | | | | | | | | |
| Volume Resistivity (μΩ-cm) | 5.5 | 7.6 | 8.3 | 9.5 | 7.8 | 9.6 | 10.6 | 11.0 | 17.0 | 16.4 |
| Storage Modulus (GPa) @−55° C. | | 15.1 | | | | | | | 5.1 | 5.4 |
| @25° C. | 17.3 | 14.2 | 13.5 | 8.8 | 11.7 | 10.0 | 7.5 | 5.7 | 4.8 | 5.1 |
| @200° C. | 13.0 | 10.9 | 10.5 | 7.5 | 9.1 | 8.0 | 6.1 | 4.7 | 4.0 | 4.3 |
| Die Shear Strength[1] (MPa) | 35.9 | 29.4 | 32.3 | 36.2 | 29.3 | 30.4 | 28.4 | 26.3 | 22.4 | 22.5 |
| Rth[2] (cm2K/W) | 0.007 | 0.006 | 0.009 | 0.011 | 0.016 | 0.010 | 0.011 | 0.014 | 0.017 | 0.011 |
| BLT[3] | 43 μm | 28 μm | 33 μm | 38 μm | 48 μm | 48 μm | 48 μm | 53 μm | 44 μm | 32 μm |
| Thermal Conductivity(W/mK) | | 178.7 | | | 101.6 | 113.8 | 96.5 | | 63.4 | 63.9 |
| CTE (×10−6/K) @25° C. | 19.0 | | | | | 19.6 | 19.4 | 19.5 | 14.8 | |
| @200° C. | 21.2 | | | | | 21.7 | 22.0 | 21.8 | 18.1 | |

| | 11 wt % | 12 wt % | 13 wt % | 14 wt % | 15 wt % | 16 wt % | 17 wt % | 18 wt % | 19 wt % | 20 wt % |
|---|---|---|---|---|---|---|---|---|---|---|
| MATERALS | | | | | | | | | | |
| Nano-silver paste (NAMICS) | 51.3 | 51.3 | 51.3 | 51.3 | 51.3 | 50.4 | 53.3 | 54.1 | 90.0 | 50.7 |
| Silver Powder (1 μm $D_{50}$) | 34.1 | 34.1 | 34.1 | 34.2 | 34.2 | 33.6 | 35.5 | 36.0 | | 33.8 |
| Silver Powder (4.8 μm $D_{50}$) | | | | | | | | | | |
| Silver Flake (4.4 μm $D_{50}$) | | | | | | | | | | |
| 2-Ethyl-1,3-hexandiol | | | | | | | | | | |
| Vehicle (Table 2) | 6.0 | 6.0 | 6.0 | 6.0 | 6.0 | 5.9 | 6.2 | 6.3 | 3.0 | 6.5 |
| Gransil PSQ Powder | | | | | | | | | | |
| Gransil PSQ-13 Powder | | | | | | | | | | |
| E+ 710 Powder | 4.3 | | | | 4.3 | 4.2 | | | 3.5 | 5.0 |
| E+ 360 Powder | 4.3 | 4.3 | 4.3 | 4.3 | 2.5 | 4.2 | | | 3.5 | 4.0 |
| E+ 320 Powder | | 4.3 | | 2.1 | 1.7 | 1.7 | | | | |
| E+ 308 Powder | | | 4.3 | 2.1 | | | | | | |
| Co-polymer EPSQ | | | | | | | 5.0 | 3.6 | | |
| Processing Temperature (° C.) | 200 | 200 | 200 | 200 | 200 | 200 | 200 | 200 | 200 | 200 |
| Processing Atmosphere | air | air | air | air | air | air | air | air | air convec | air convec |

TABLE 3-continued

Adhesive paste formulations and functional properties for adhesive paste formulations 1 to 29

| PROPERTIES | | | | | | | | | | | |
|---|---|---|---|---|---|---|---|---|---|---|---|
| Volume Resistivity (μΩ-cm) | | 9.0 | 10.1 | 11.0 | 11.0 | 10.0 | 11.0 | 17.5 | 14.0 | 7.5 | 12.1 |
| Storage Modulus (GPa) | @−55° C. | | | | | | | | | 15.1 | 7.0 |
| | @25° C. | 7.5 | 7.6 | 7.1 | 7.2 | 7.8 | 6.7 | 3.3 | 5.1 | 14.4 | 6.7 |
| | @200° C. | 6.6 | 6.7 | 5.8 | 6.6 | 6.7 | 5.9 | 2.5 | 3.9 | 13.1 | 5.8 |
| Die Shear Strength[1](MPa) | | 28.8 | 25.2 | 19.8 | 17.8 | 24.1 | 22.1 | 15.0 | 17.2 | 29.4 | 31.4 |
| Rth[2] (cm2K/W) | | 0.008 | 0.005 | 0.006 | 0.008 | 0.006 | 0.008 | 0.029 | 0.025 | 0.006 | 0.010 |
| BLT[3] | | 41 μm | 23 μm | 28 μm | 33 μm | 30 μm | 38 μm | 36 μm | 30 μm | 28 μm | 37 μm |
| Thermal Conductivity(W/mK) | | | | | | | | | | | |
| CTE (×10−6/K) | @25° C. | | | | | | | | | 21.5 | 17.0 |
| | @200° C. | | | | | | | | | 23.0 | 28.4 |

| | 21 wt % | 22 wt % | 23 wt % | 24 wt % | 25 wt % | 26 wt % | 27 wt % | 28 wt % | 29 wt % |
|---|---|---|---|---|---|---|---|---|---|
| MATERIALS | | | | | | | | | |
| Nano-silver paste (NAMICS) | 53.3 | 35.2 | 21.8 | 20.8 | 20.0 | 21.9 | 29.2 | 21.9 | 29.2 |
| Silver Powder (1 μm $D_{50}$) | 35.5 | 52.5 | 65.5 | 62.2 | 60.0 | 43.9 | 29.2 | 43.9 | 29.2 |
| Silver Powder (4.8 μm $D_{50}$) | | | | | | 21.9 | 29.2 | | |
| Silver Flake (4.4 μm $D_{50}$) | | | | | | | | 21.9 | 29.2 |
| 2-Ethyl-1,3-hexandiol | | | | 2.5 | 5.5 | | | | |
| Vehicle (Table 2) | 5.4 | 5.7 | 6.1 | 6.5 | 6.5 | 6.2 | 5.8 | 6.2 | 5.8 |
| Gransil PSQ Powder | | | | | | | | | |
| Gransil PSQ-13 Powder | | | | | | | | | |
| E+ 710 Powder | 2.9 | 3.3 | 6.6 | 4.0 | 4.0 | | | | |
| E+ 360 Powder | 2.9 | 3.3 | | 4.0 | 4.0 | 6.1 | 6.6 | 6.1 | 6.6 |
| E+ 320 Powder | | | | | | | | | |
| E+ 308 Powder | | | | | | | | | |
| Co-polymer EPSQ | | | | | | | | | |
| Processing Temperature (° C.) | 200 | 200 | 200 | 200 | 200 | 200 | 200 | 200 | 200 |
| Processing Atmosphere | air convec | air convec | air convec | air convec | air convec | air convec | air convec | air convec | air convec |
| PROPERTIES | | | | | | | | | |
| Volume Resistivity (μΩ-cm) | 7.7 | 7.3 | 7.9 | 10.7 | 11.8 | 7.1 | 9.0 | 8.1 | 8.0 |
| Storage Modulus (GPa) @−55° C. | 12.9 | 12.7 | 11.8 | 8.8 | 7.0 | 14.2 | 11.4 | 14.2 | 12.0 |
| @25° C. | 12.0 | 11.8 | 10.8 | 8.1 | 6.6 | 13.1 | 10.6 | 13.1 | 11.1 |
| @200° C. | 9.1 | 9.5 | 8.5 | 6.5 | 5.5 | 10.4 | 8.6 | 10.4 | 8.7 |
| Die Shear Strength[1] (MPa) | 40.0 | 51.1 | 43.9 | 29.5 | 28.7 | 39.5 | 39.6 | 40.7 | 39.9 |
| Rth[2] (cm2K/W) | 0.007 | 0.011 | 0.013 | 0.011 | 0.016 | 0.008 | 0.009 | 0.010 | 0.008 |
| BLT[3] | 35 μm | 38 μm | 48 μm | 38 μm | 35 μm | 30 μm | 36 μm | 36 μm | 32 μm |
| Thermal Conductivity (W/mK) | 103.0 | 108.7 | 108.2 | 86.6 | 88.7 | 106.7 | 85.2 | 88.2 | 73.2 |
| CTE (×10−6/K) @25° C. | 19.3 | | 19.2 | | | | | | 19.2 |
| @200° C. | 24.3 | | 26.4 | | | | | | 23.1 |

[1]2.5 mm × 2.5 mm Au metallized Si die on metallized Al2O3 substrate
[2]7.5 mm × 7.5 mm Au metallized Si die on Au metallized Si substrate
[3]bondline thickness of die attach part, e.g. adhesive thickness

Example 1(a): Preparation of Adhesive Paste Formulation 7

The adhesive paste formulation 7 was prepared in a 20 gram batch for evaluation. The paste was prepared by blending 10.44 grams of a nano-silver paste ("NAMICS" (Namics Corporation, Niigata-shi, Japan) nano-silver paste prepared with nano-silver, 2 wt % amine acetate, and 8 wt % solvent), 6.94 grams of nominally 1 micron ($D_{50}$) silver powder (Metalor Technologies, North Attleboro, Mass.), 0.7 gram of "PSQ" polymethyl-silsesquioxane fine powder (Grant Industries, Inc., Elmwood Park, N.J.), 0.7 gram of "PSQ-13" polymethylsilsesquioxane fine powder (Grant Industries, Inc., Elmwood Park, N.J.) and 1.22 grams of a vehicle. The paste vehicle composition is set forth in Table 2 hereinabove, and consists of the following materials: 2-ethyl-1,3-hexanediol (Sigma-Aldrich, St. Louis, Mo.), butyl Carbitol™ acetate (The Dow Chemical Company, Midland, Mich.), BYK111 dispersant (D. N. Lukens Inc., Westborough, Mass.) and FC-4432 surfactant (3M Center, St. Paul, Minn.).

The adhesive paste was first blended by hand until all dry components were mixed in, then the paste was blended and de-aired using a Thinky Planetary Centrifugal mixer. The paste was either used immediately, or stored at −40° C. for future use for parts preparation (the paste was thawed to room temperature prior to parts preparation).

Example 1(b): Preparation of Adhesive Paste Formulations 1 to 6 and 8 to 29

The adhesive paste formulations 1 to 6 and 8 to 29 were prepared in a manner similar to the preparation of adhesive paste formulation 7.

Example 2: Preparation of Adhesive Paste Formulations 30 to 52

The adhesive paste formulations 30 to 52 were prepared using the 2-ethyl-1,3-hexanediol solvent (or the vehicle formulation set forth in Table 2 and described in Example 1(a) hereinabove) and having the compositions set forth in Table 4. The adhesive paste formulations 30 to 52 were prepared in a similar manner to Example 1.

Formulations in Table 4 contain epoxy resin and thermoplastic resin components and are considered organic/inorganic adhesives, where the choice of thermally conductive filler powder and the adhesive processing temperature determines if the adhesive is characterized as a resin-type or a sintering-type. The epoxy or thermoplastic content ranged from 0.5 to 8 wt % for each, or a range of 0.5 to 14 wt % for a combined epoxy and thermoplastic content. The preferred content of epoxy and/or thermoplastic content is 2 to 10 wt %, and the most preferred content was 4 to 9 wt %.

The nano-silver paste ("NAMICS") referred to in Table 4 is produced by Namics Corporation, Niigata-shi, Japan as described in Example 1.

TABLE 4

Adhesive paste formulations and functional properties for adhesive paste formulations 30 to 52

| | 30 wt % | 31 wt % | 32 wt % | 33 wt % | 34 wt % | 35 wt % | 36 wt % | 37 wt % |
|---|---|---|---|---|---|---|---|---|
| MATERALS | | | | | | | | |
| Nano-silver paste (NAMICS) | | | | | | | | |
| Ag Powder (1 μm $D_{50}$) | 84.2 | 84.5 | 83.0 | 81.5 | 80.0 | 86.1 | 82.8 | 78.4 |
| 2-Ethyl-1,3-hexandiol | 9.3 | 7.5 | 7.0 | 6.5 | 6.0 | 6.9 | 7.2 | 7.6 |
| Vehicle (Table 2) | | | | | | | | |
| E+ 380 Powder | 6.0 | 6.0 | 6.0 | 6.0 | 6.0 | 1.0 | 4.0 | 8.0 |
| E+ 360 Powder | | | | | | | | |
| EpoPro 602 Epoxy (w/catalyst) | 0.5 | 2.0 | 4.0 | 6.0 | 8.0 | 6.0 | 6.0 | 6.0 |
| SF3110 thermoplastic | | | | | | | | |
| Processing Temperature (° C.) | 175 | 175 | 175 | 175 | 175 | 175 | 175 | 175 |
| Processing Atmosphere | air convec | air convec | air convec | air convec | air convec | air convec | air convec | air convec |
| PROPERTIES | | | | | | | | |
| Volume Resistivity (μΩ-cm) | 29.7 | 10.0 | 10.7 | 12.1 | 16.8 | 10.2 | 11.8 | 17.4 |
| Storage Modulus (GPa) @−55° C. | | 11.2 | 12.6 | 11.1 | 11.0 | 13.9 | 12.7 | 9.3 |
| @25° C. | | 10.1 | 10.6 | 9.2 | 8.1 | 9.7 | 9.8 | 6.9 |
| @200° C. | | 5.0 | 4.6 | 3.7 | 2.6 | 4.5 | 3.7 | 2.2 |
| Tg1 (° C.) | | 51.6 | 48.4 | 49.6 | 41.2 | 32.0 | 42.4 | 43.2 |
| Tg2 (° C.) | | | | | | | | |
| Die Shear Strength[1] (MPa) | 1.6 | 9.6 | 24.6 | 26.5 | 18.9 | 25.6 | 28.8 | 29.3 |
| Rth[2] (cm2K/W) | 0.028 | 0.023 | 0.015 | 0.016 | 0.019 | 0.014 | 0.015 | 0.017 |
| BLT[3] | 30 μm | 35 μm | 29 μm | 30 μm | 32 μm | 24 μm | 42 μm | 37 μm |
| Thermal Conductivity (W/mK) | 21.8 | 62.7 | 69.8 | 70.5 | 48.0 | | 65.9 | 45.7 |

| | 38 wt % | 39 wt % | 40 wt % | 41 wt % | 42 wt % | 43 wt % | 44 wt % | 45 wt % |
|---|---|---|---|---|---|---|---|---|
| MATERALS | | | | | | | | |
| Nano-silver paste (NAMICS) | | | | | | | | |
| Ag Powder (1 μm $D_{50}$) | 76.2 | 74.0 | 78.5 | 81.0 | 78.5 | 75.5 | 72.5 | 79.0 |
| 2-Ethyl-1,3-hexandiol | 7.8 | 8.0 | | 6.5 | 6.5 | 6.5 | 7.5 | 9.0 |
| Vehicle (Table 2) | | | 7.0 | | | | | |
| E+ 380 Powder | 10.0 | 12.0 | | 6.0 | 6.0 | 6.0 | 6.0 | 6.0 |
| E+ 360 Powder | | | 9.0 | | | | | |
| EpoPro 602 Epoxy (w/catalyst) | 6.0 | 6.0 | 5.5 | 6.0 | 6.0 | 6.0 | 6.0 | |
| SF3110 thermoplastic | | | | 0.5 | 3.0 | 6.0 | 8.0 | 6.0 |
| Processing Temperature (° C.) | 175 | 175 | 175 | 175 | 175 | 175 | 175 | 200 |
| Processing Atmosphere | air convec | air convec | air convec | air convec | air convec | air convec | air convec | air convec |
| PROPERTIES | | | | | | | | |
| Volume Resistivity (μΩ-cm) | 20.7 | 23.4 | 14.7 | 15.7 | 21.0 | 27.8 | 30.5 | 361.0 |
| Storage Modulus (GPa) @−55° C. | 8.3 | 7.3 | 10.5 | 10.6 | 8.5 | 4.4 | 7.1 | 12.3 |
| @25° C. | 6.2 | 6.3 | 7.2 | 7.7 | 4.9 | 3.2 | 4.5 | 10.1 |
| @200° C. | 2.0 | 1.9 | 3.2 | 2.9 | 1.6 | 1.0 | 0.8 | 0.7 |
| Tg1 (° C.) | 44.5 | 48.0 | 31.4 | 39.1 | 33.9 | 39.1 | 37.3 | 44.1 |
| Tg2 (° C.) | | | | | | | | |
| Die Shear Strength[1] (MPa) | 27.3 | 25.3 | 36 | 21.9 | 17.3 | 16.7 | 17.8 | 17.5 |
| Rth[2] (cm2K/W) | 0.019 | 0.017 | | 0.016 | 0.026 | 0.048 | 0.074 | 0.065 |
| BLT[3] | 44 μm | 28 μm | | 38 μm | 35 μm | 34 μm | 39 μm | 34 μm |
| Thermal Conductivity (W/mK) | 36.7 | 32.4 | 60.3 | 49.0 | 41.2 | 29.3 | 22.6 | 59.6 |

| | 46 wt % | 47 wt % | 48 wt % | 49 wt % | 50 wt % | 51 wt % | 52 wt % |
|---|---|---|---|---|---|---|---|
| MATERIALS | | | | | | | |
| Nano-silver paste (NAMICS) | | 20.3 | 48.8 | 47.3 | 30.0 | 50.3 | 81.5 |
| Ag Powder (1 μm D50) | 82.6 | 60.8 | 32.6 | 31.6 | 45.0 | 33.6 | |
| 2-Ethyl-1,3-hexandiol | | 6.5 | 6.1 | 6.1 | 8.0 | 6.1 | 6.0 |
| Vehicle (Table 2) | 7.5 | | | | | | |
| E+ 380 Powder | 5.8 | 6.0 | 6.0 | 6.0 | 6.0 | 6.0 | 6.0 |
| E+ 360 Powder | | | | | | | |

TABLE 4-continued

Adhesive paste formulations and functional properties for adhesive paste formulations 30 to 52

| | | | | | | | |
|---|---|---|---|---|---|---|---|
| EpoPro 602 Epoxy (w/catalyst) | 3.3 | 4.0 | 4.0 | 4.0 | 4.0 | 4.0 | 4.0 |
| SF3110 thermoplastic | 0.8 | 2.5 | 2.5 | 5.0 | 7.0 | | 2.5 |
| Processing Temperature (° C.) | 200 | 200 | 200 | 200 | 200 | 200 | 200 |
| Processing Atmosphere | air convec | air convec | air convec | air convec | air convec | air convec | air convec |
| PROPERTIES | | | | | | | |
| Volume Resistivity (μΩ-cm) | 12.9 | 47.8 | 25.5 | 27.3 | 28.6 | 12.4 | 14.1 |
| Storage Modulus(GPa)   @−55° C. | 12.6 | 7.6 | 7.0 | 8.1 | 8.6 | 10.3 | 9.9 |
| @25° C. | 12.2 | 6.3 | 6.0 | 6.7 | 7.0 | 8.9 | 9.1 |
| @200° C. | 3.6 | 0.8 | 1.4 | 2.8 | 1.0 | 3.3 | 3.1 |
| Tg1 (° C.) | 78.0 | 38.1 | 39.9 | 41.9 | 41.8 | 85.5 | 41.1 |
| Tg2 (° C.) | | 97.9 | 90.6 | 82.5 | 74.0 | | 85.1 |
| Die Shear Strength[1] (MPa) | 32.3 | 33.2 | 37.1 | 38.3 | 32.6 | 20.5 | |
| Rth[2] (cm2K/W) | 0.012 | 0.011 | 0.012 | 0.017 | 0.037 | 0.010 | 0.018 |
| BLT[3] | 57 μm | 29 μm | 30 μm | 33 μm | 48 μm | 39 μm | 45 μm |
| Thermal Conductivity (W/mK) | 62.1 | 41.0 | 69.1 | 36.3 | 33.5 | 59.6 | 49.5 |

[1] 2 mm × 2 mm Au metallized Si die on Ag metallized Copper Leadframe substrate
[2] 5 mm × 5 mm Au metallized Si die on Au metallized Si substrate
[3] bondline thickness of die attach part, e.g. adhesive thickness

Example 2(a): Preparation of Adhesive Paste Formulation 42

The adhesive paste formulation 42 was prepared in a 30 gram batch for evaluation. The paste was prepared by blending 23.55 grams of nominally 1 micrometer ($D_{50}$) silver powder (Metalor Technologies, North Attleboro, Mass.), 1.8 grams of EpoPro 602 epoxy (Specialty Polymers and Services, Valencia, Calif.), 0.9 gram of a SF3110 thermoplastic resin (Schaetti, Wallisellen, Switzerland), 1.8 grams of a "E+380" polymethylsilsesquioxane fine powder (ABC NANOTECH, Daejeon, Korea), and 1.95 grams of 2-ethyl-1,3-hexanediol solvent.

Example 2(b): Preparation of Adhesive Paste Formulations 30 to 41 and 43 to 52

The adhesive paste formulations 30 to 41 and 43 to 52 were prepared in a manner similar to the preparation of adhesive paste formulation 42.

Example 3: Preparation of Adhesive Paste Formulations 53 to 64

Resin-type, sintering-type, or inorganic silver-glass sintering-type adhesives can be prepared by blending individual components together, or by adding a polyorganosilsesquioxane fine powder, a copolymer powder as described above, or combinations thereof, to a known adhesive formulation (e.g., a commercially available product); polymethylsilsesquioxane fine powder and a polymethylsilsesquioxane/polydimethylsiloxane copolymer powders are preferred.

FIG. 9 include scanning electron images which show the impact of polymethylsilsesquioxane fine powder additions to UNIMEC XH9890-6A adhesive paste (Namics Corporation, Niigata-shi, Japan), a sintering-type adhesive, on the microstructure. The UNIMEC XH9890-6A paste is a thermally conductive silver paste that contains a thermosetting resin and a thermoplastic resin component (i.e., a sintering-type organic/inorganic adhesive). The polymethylsilsesquioxane particles are well dispersed throughout the adhesive microstructure, and dense regions of high thermal conductivity adhesive are formed; and wherein the resulting interfacial bonding remains excellent.

Table 5 provides adhesive paste formulations and functional properties of such adhesives. Polymethylsilsesquioxane fine particle additions were made to UNIMEC XH9890-6A sintering-type adhesive (formulations 53 to 56), DM6030Hk/F945 resin-type adhesive (formulations 57 to 61), and XH9930 silver-glass sintering-type adhesive (formulations 62 to 64); all of which were from Namics Corporation, Niigata-shi, Japan. The preferred content of the polymethylsilsesquioxane fine powder, the polymethylsilses-quioxane/polydimethylsiloxane copolymer, or a combination thereof, ranges from 3 to 12 wt %, with the most preferred range being 4 to 9 wt %.

TABLE 5

Polymethylsilsesquioxane fine powder additions to sintering-type, resin-type and inorganic silver-glass type adhesive pastes

| | 53 wt % | 54 wt % | 55 wt % | 56 wt % | 57 wt % | 58 wt % |
|---|---|---|---|---|---|---|
| MATERIALS | | | | | | |
| XH9890-6A Paste (NAMICS Corp.) sintering-type adhesive | 100.0 | 97.0 | 94.0 | 88.0 | | |
| DM6030Hk/F954 Paste (NAMICS Corp.) resin-type adhesive | | | | | 100.0 | 97.0 |
| XH9930 Paste (NAMICS Corp.) inorganic silver-glass type adhesive | | | | | | |

TABLE 5-continued

Polymethylsilsesquioxane fine powder additions to sintering-type, resin-type and inorganic silver-glass type adhesive pastes

|  |  |  |  |  |  |  |
|---|---|---|---|---|---|---|
| E+ 710 |  |  |  |  | 6.0 |  |
| E+ 360 |  | 3.0 | 6.0 | 6.0 |  | 3.0 |
| Processing Temperature (° C.) | 200 | 200 | 200 | 200 | 200 | 200 |
| Processing Atmosphere | air convec | air convec | air convec | air convec | air convec | air convec |
| PROPERTIES |  |  |  |  |  |  |
| Volume Resistivity (μΩ-cm) | 9.4 | 13.7 | 17.6 | 24.7 | 8.8 | 10.5 |
| Storage Modulus (GPa) @−55° C. | 17.7 | 12.1 | 11.0 | 9.7 | 21.3 | 16.6 |
| @25° C. | 17.0 | 11.6 | 9.9 | 8.4 | 18.5 | 13.8 |
| @200° C. | 8.1 | 3.7 | 3.3 | 4.0 | 6.3 | 4.8 |
| Tg1 (° C.) | 41.4 | 44.3 | 50.9 | 42.5 | 62.4 | 45.8 |
| Tg2 (° C.) | 70.8 | 115.8 | 119.2 | 125.4 | 91.7 | 65.0 |
| Die Shear Strength[1] (MPa) | 44.9 | 41.9 | 38.7 | 28.2 |  |  |
| Die Shear Strength[2] (MPa) |  |  |  |  | 34.3 | 37.3 |
|  | 59 wt % | 60 wt % | 61 wt % | 62 wt % | 63 wt % | 64 wt % |
| MATERIALS |  |  |  |  |  |  |
| XH9890-6A Paste (NAMICS Corp.) sintering-type adhesive |  |  |  |  |  |  |
| DM6030Hk/F954 Paste (NAMICS Corp.) resin-type adhesive | 94.0 | 91.0 | 88.0 |  |  |  |
| XH9930 Paste (NAMICS Corp.) inorganic silver-glass type adhesive |  |  |  | 100.0 | 97.0 | 94.0 |
| E+ 710 |  |  |  |  |  |  |
| E+ 360 | 6.0 | 9.0 | 12.0 |  | 3.0 | 6.0 |
| Processing Temperature (° C.) | 200 | 200 | 200 | 200 | 200 | 200 |
| Processing Atmosphere | air convec | air convec | air convec | air | air | air |
| PROPERTIES |  |  |  |  |  |  |
| Volume Resistivity (μΩ-cm) | 14.1 | 18.8 | 25.4 | 7.1 | 10.8 | 16.3 |
| Storage Modulus (GPa) @−55° C. | 11.5 | 9.3 | 6.6 |  | 18.6 | 12.4 |
| @25° C. | 10.0 | 8.0 | 5.6 | 26.0 | 17.7 | 11.9 |
| @200° C. | 3.2 | 2.4 | 1.6 | 23.4 | 15.8 | 10.8 |
| Tg1 (° C.) | 71.9 | 73.0 | 74.3 |  |  |  |
| Tg2 (° C.) |  |  |  |  |  |  |
| Die Shear Strength[1] (MPa) |  |  |  | 41.4 | 29.7 | 16.0 |
| Die Shear Strength[2] (MPa) | 36.8 | 33.5 | 32.2 |  |  |  |

[1] 2.5 mm × 2.5 mm Au metallized Si die on metallized Al2O3 substrate
[2] 2.5 mm × 2.5 mm Si die on Al2O3 substrate

Example 3(a): Preparation of Adhesive Paste Formulation 55

Example 3(a): Preparation of Adhesive Paste Formulation 55

The adhesive paste formulation 55 was prepared in a 20 gram batch for evaluation. The paste was prepared by blending 18.8 grams of UNIMEC XH9890-6A (Namics Corporation, Niigata-shi, Japan) adhesive paste and 1.2 grams of "E+360" polymethyl-silsesquioxane fine powder (ABC NANOTEC, Daejeon, Korea). The adhesive paste formulation 55 was first blended by hand until the dry component was mixed in, then the paste was blended and de-aired using a Thinky Planetary Centrifugal mixer. The paste was either used immediately or stored at −40° C. for future use in parts preparation (the paste was thawed to room temperature prior to parts preparation).

Example 3(b): Preparation of Adhesive Paste Formulations 54 and 56

The adhesive paste formulations 54 and 56 were prepared in a manner similar to the preparation of adhesive paste formulation 55.

Example 3(c): Preparation of Adhesive Paste Formulations 58

The adhesive paste formulation 58 was prepared in a 20 gram batch for evaluation. The paste was prepared by blending 19.4 grams of DM6030Hk/F954 (Namics Corporation, Niigata-shi, Japan) adhesive paste and 0.6 gram of "E+360" polymethyl-silsesquioxane fine powder (ABC NANOTEC, Daejeon, Korea). The adhesive paste formulation 58 was first blended by hand until the dry component was mixed in, then the paste was blended and de-aired using a Thinky Planetary Centrifugal mixer. The paste was either used immediately or stored at room temperature for future use in parts preparation.

Example 3(d): Preparation of Adhesive Paste Formulations 59 to 61 and 63 to 64

The adhesive paste formulations 59 to 61 and 63 to 64 were prepared in a manner similar to the preparation of adhesive paste formulation 58.

The functional properties of the adhesive paste formulations shown in Table 5 showed a significant decrease in storage modulus as the polymethylsilsesqioxane content increased, while maintaining excellent die shear strength.

The sintered adhesive paste formulation 55 also displayed a very good thermal conductivity value of 55.8 W/mK, which is comparable to the thermal conductivity value of about 57 W/mK for a gold-tin solder. These data indicate that polymethylsilsesquioxane fine powder additions are effective at reducing the storage modulus of various commercial adhesives, while maintaining good thermal properties.

Example 4. Thermal Processes for Sintering Adhesive Paste Formulations 1 to 64

Various parts were prepared for evaluation of the adhesive functional performance, and the adhesive paste formulations were processed (sintered) using one of the following thermal profiles:

(a) 200° C. profile: 60 minute ramp to 200° C. and hold at 200° C. for 60 minutes in an air (no convection), or a mechanical air convection oven;

(b) 175° C. profile: 30 minutes ramp to 175° C. and hold at 175° C. for 60 minutes in a mechanical air convection oven;

(c) modified profiles: profiles (a) and (b) with an addition of a 60 minute hold at 100° C. for improved evaporation of the solvent/vehicle paste component for 1-layer thermal conductivity parts;

370° C. profile: 30 minute ramp to 370° C. and hold at 370° C. for 10 minutes in an air (no convection) furnace.

A distinction is made in the paste formulations tables between thermal profiles that used air versus mechanical air convection for processing parts due to the differences observed in the functional properties for the same paste formulation. In general, it was found that processing with mechanical air convection resulted in improved sintering of the adhesive paste and the die attach part.

Example 5: Preparation of Test Parts and Property Measurements

Various test parts were prepared for functional property evaluation. One group of test parts included bulk sample parts. Bulk sample parts were formed (or shaped) into the appropriate size for property measurement, wherein thin or thick film sintered adhesive was prepared using a wet paste "Dr-Blade" process, following by sintering the parts in a manner described in Example 4.

Another group of parts consisted of die attach test parts. In general, die attach test parts were prepared by dispensing the appropriate amount of the adhesive paste formulation onto a substrate and a gold metallized silicon die was placed on top of the adhesive paste formulation and a slight pressure was applied. The adhesive paste formulation flowed and spread to the die perimeter and formed a fillet that rose about half the thickness of the die. Adhesive bondline thickness values were typically between 25 to 50 micrometers. Die attach parts were processed in a manner described in Example 4. FIG. 5 provides an illustration of a die attach part.

Volume resistivity measurements were made on bulk adhesive parts that nominally measured 5 mm wide by 60 mm long and 0.25 mm thick. A 4-point resistance measurement, using a Keithley 2400 SourceMeter, was used to determine the volume resistivity.

Storage modulus measurements were made on sintered bulk adhesive parts that nominally measured 5 mm wide by 40 mm long and 0.25 mm thick, using Dynamic Mechanical Analysis (DMA) equipment (Hitachi DMS7100 EXSTAR).

The Tan Delta curve from the DMA equipment was used to determine the glass transition temperature(s)(Tg) of the adhesives. The coefficient of thermal expansion (CTE) measurements were made, using similar shaped parts to the DMA test, using Thermomechanical Analysis (TMA) equipment (NETZSCH TMA 402 F3).

Thermal conductivity (i.e., 1-layer thermal conductivity) measurements were made on sintered bulk adhesive parts that nominally measured 10 mm wide by 10 mm long and 0.5 mm to 0.8 mm thick. Laser Flash Technique (LFA) equipment (NETZSCH LFA447 Nano-Flash) was used to measure the thermal diffusivity of the part, and the thermal conductivity was calculated using the calculated heat capacity value and the adhesive density (measured using the Archimedes method).

The LFA was also used to measure the interfacial resistance (Rth) of sintered die attach parts. Rth measurements were used to evaluate the quality of the bonded interfaces, with low Rth values indicative of excellent bonding at the adhesive interfaces of the manufactured die attach part. Test parts were prepared using 7.5 mm×7.5 mm (or 5 mm×5 mm) gold metallized silicon die bonded to a 10 mm×10 mm gold metallized silicon substrate; about 10-15 milligrams of adhesive paste was used to form the test part.

Die shear strength measurements were made on sintered die attach parts that consisted of various sizes of gold metallized silicon die bonded to a metallized substrate; the substrates included a gold metallized alumina, a silver metallized alumina, and a silver metallized copper lead frame. The SATEC (T1000) and DAGE (4000 Optima) BondTesters were used to test the die shear strength (adhesion) of the parts. The DAGE BondTester was equipped with a programmable heating plate to make die shear strength measurements at elevated temperatures.

Example 6: Moisture Resistance Test

Adhesive paste formulations 6 and 7 were prepared as described hereinabove in Example 1. Die attach parts (for die shear testing) were prepared in a manner that was similar to Example 5 using about 1.5 milligrams of paste on gold metallized alumina substrates; a 2.5 mm×2.5 mm gold metallized silicon die was used for die attach. Die attach parts were processed at 200° C. using the thermal profile set forth in (a) of Example 4.

Sintered die attach parts were exposed to an accelerated moisture resistance test called the pressure cooker test ("PCT"). The pressure cooker test consisted of placing die attach parts in the headspace of a pressure cooker (exposure to steam only), and raising the temperature to 121° C., and the pressure to 15 psi. Parts were removed from the PCT at 8 hours and 16 hours exposure, and the DAGE BondTester was used to measure the die shear strength. The die shear strength values for 0, 8, and 16 hours of PCT exposure are shown in Table 6.

TABLE 6

Die shear strength for adhesive paste formulations 6 and 7 sintered die attach parts exposed to the pressure cooker test for 0, 8 and 16 hours

| | | Time in PCT (hours) | | |
| --- | --- | --- | --- | --- |
| | | 0 | 8 | 16 |
| Die Shear Strength (MPa) | paste 6 | 32.6 | 39.3 | 40.3 |
| | paste 7 | 32.0 | 34.0 | 32.9 |

In both cases, the adhesive showed exceptional resistance to moisture attack, with no degradation of the die shear strength observed as a function of PCT exposure time. In particular, the adhesive paste formulation 7 which had a storage modulus value of 7.5 GPa at 25° C. showed an excellent die shear strength, and did not exhibit a loss of adhesion with exposure to moisture. The exceptional performance of these parts is considered to be attributed to the hydrophobic nature of the polymethylsilsesquioxane fine powder.

Example 7: Hot Die Shear Testing

The adhesive paste formulation 21 (prepared according to Example 1) was used to evaluate die attach adhesion (i.e., die shear strength) at high temperatures. Die shear test parts were prepared in the manner described in Example 5, by dispensing about 1.5 milligrams of the adhesive paste formulation 21 onto a gold metallized alumina substrate; a 2.5 mm×2.5 mm gold metallized silicon die was used for die attach. Die attach parts were processed at 200° C., using the thermal profile set forth in (a) of Example 4.

The adhesion of the sintered die attach parts was tested using a DAGE BondTester that was equipped with a programmable heating plate to make die shear strength measurements at elevated temperatures; the die shear strength values were measured at 21° C., 250° C., 300° C. and 350° C. and are shown in Table 7. The die shear strength showed a steady decrease from 40 MPa at room temperature to 12.1 MPa at 350° C. While a decrease in the die shear strength was observed with increased temperature, the die shear parts maintained very good structural integrity up to 350° C., where a 7.7 kilogram force was required to cause die shear failure of the part.

TABLE 7

Die shear strength for adhesive paste formulation 21 die attach parts as a function of temperature; 21° C., 250° C., 300° C. and 350° C.
Paste Formulation 21 Die Attach Parts

| | Temperature (° C.) | | | |
|---|---|---|---|---|
| | 21 | 250 | 300 | 350 |
| Die Shear Strength (MPa) | 40.0 | 26.7 | 18.3 | 12.1 |

Good die shear strength at 260° C. is important because semiconductor devices often go through a solder reflow process at this temperature, and the die needs to maintain good adhesion. Good die shear strength at 300° C. to 350° C. is exceptional, and opens up opportunities for high temperature secondary processes without damaging adhesion or functional properties of the die attached part.

Example 8: Thermal Cycling Test

A thermal cycling test was conducted with die attach parts prepared with the adhesive paste formulation 21; the adhesive paste formulation 21 was prepared as described hereinabove in Example 1. Die shear test parts were prepared in the manner described in Example 5, by dispensing about 1.5 milligrams of the adhesive paste formulation onto a silver metallized alumina substrate; a 2.5 mm×2.5 mm gold metallized silicon die was used for die attach. Die attach parts were processed at 200° C., using the thermal profile set forth in (a) of Example 4.

A thermal cycling test was carried out in an ESPEC Thermal Shock Chamber, wherein parts were shuttled between temperature zones of +175° C. (30 minute hold) and −55° C. (30 minutes hold) for 1 cycle count. The thermal cycling test is an accelerated test designed to evaluate long-term reliability of parts/devices. Die attach parts/devices that have high stress at the adhesive bondline often exhibit severe die shear strength degradation (due to crack formation), or delamination of the die from the substrate when exposed to the thermal cycling test.

Sintered die attach parts were prepared with the adhesive paste formulation 21, and were subjected to 250 and 480 cycles of +175° C. and −55° C. Die shear strength values were measured using the DAGE BondTester and are shown in Table 8.

TABLE 8

Thermal cycling test (TCT) of adhesive paste formulation 21 die attach parts fired to 200° C.; 2.5 mm × 2.5 mm gold metallized silicon die on gold metallized alumina
Paste Formulation 21 die Attach Parts

| | Number of Thermal Cycles (+175° C./−55° C.) | | |
|---|---|---|---|
| | 0 | 250 | 480 |
| Die Shear Strength (MPa) | 40.0 | 35.4 | 34.3 |

A small decrease in adhesion was observed in the die shear strength following 250 and 480 cycles; however, the die shear strength values remained very good. These data indicate that there were acceptable adhesive bondline stress levels for these parts.

Example 9: High Temperature Storage Test

The thermal stability of adhesives at temperatures of greater than 200° C. is becoming increasingly important with advances in high power semiconductor devices. While adhesives may perform satisfactorily at elevated temperatures (>200° C.) with intermittent exposure, continuous high temperature use adhesives are needed to meet the operating conditions of high power, high temperature devices.

A 250° C. high temperature storage test was performed using die attach parts prepared with the adhesive paste formulation 21. The adhesive paste formulation 21 was prepared as described hereinabove in Example 1. Die shear test parts were prepared in the manner described in Example 5, by dispensing about 1.5 milligrams of the adhesive paste formulation 21 onto a gold metallized alumina substrate; a 2.5 mm×2.5 mm gold metallized silicon die was used for die attach. Die attach parts were processed at 200° C., using the thermal profile set forth in (a) of Example 4.

Die attach parts prepared with the adhesive paste formulation 21 were placed in a 250° C. furnace, in air, for 250 hours to evaluate the effect of high temperature storage. Die shear strength values were measured using the DAGE BondTester and interfacial resistance values (Rth) were measured using the LFA; hot storage data are shown in Table 9.

TABLE 9

High temperature storage (250° C.) evaluation of paste formulation 21 die attach parts, fired to 200° C.; 2.5 mm × 2.5 mm gold metallized silicon die on gold metallized alumina
Paste Formulation 21 Die Attach Parts

| | Storage Time at 250° C. (hours) | |
|---|---|---|
| | 0 | 250 |
| Die Shear Strength (MPa) | 40 | 26.4 |
| Interfacial Resistance (Kcm$^2$/W) | 0.006 | 0.007 |

The die shear strength decreased from 40 MPa to 26.4 MPa following the 250° C. high temperature storage test. While a significant decrease in the die shear strength was observed, the adhesion remained very good. The interfacial resistance values, however, remained excellent throughout the test which indicates that the interfacial bonding with the adhesive did not degrade; this is very important for maintaining good heat flow (heat dissipation) through the die attach part.

A second high temperature storage test was conducted at 225° C. in air. In this case, a 5 mm×5 mm gold metallized silicon die was bonded to a silver metallized copper leadframe substrate. This die attach combination is sometimes used for construction of high power devices, where an operating temperature of about 225° C. is observed at the adhesive bondline.

The 225° C. high temperature storage test was performed using die attach parts prepared with the adhesive paste formulation 21. The adhesive paste formulation 21 was prepared as described hereinabove in Example 1. Die shear test parts were prepared in the manner described in Example 5, by dispensing about 10 milligrams of the adhesive paste formulation 21 onto a silver metallized copper lead frame substrate; a 5 mm×5 mm gold metallized silicon die was used for die attach. Die attach parts were processed at 200° C., using the thermal profile set forth in Example 4(a).

Die attach parts prepared with the adhesive paste formulation 21 were placed in a 225° C. furnace (in air) for 250, 500 and 1000 hours to evaluate the effect of 225° C. high temperature storage. Die shear strength values were measured using the DAGE BondTester and interfacial resistance values (Rth) were measured using the LFA; 225° C. storage data are shown in Table 10.

TABLE 10

High temperature storage (225° C.) evaluation of paste formulation 21 die attach parts, fired to 200° C.; 5 mm × 5 mm gold metallized silicon die on silver metallized copper lead frame
Paste Formulation 21 Die Attach Parts

| | Storage Time at 225° C. (hours) | | | |
|---|---|---|---|---|
| | 0 | 250 | 500 | 1000 |
| Die Shear Strength (MPa) | 26.3 | 27.3 | 28.3 | |
| Interfacial Resistance Resistance (Kcm$^2$/W) | 0.005 | 0.005 | 0.004 | 0.006 |

The die attach parts showed excellent performance for 225° C. storage, where both die shear strength values (up to 500 hours) and Rth values (up to 1000 hours) showed no degradation. In particular, the die shear strength parts required shear forces of about 70 kilograms for failure to occur with the 5 mm×5 mm die on silver plated copper leadframe.

Example 10: Evaluation of Bleed Around Die

The adhesive paste formulation 7 (prepared in a manner similar to Example 1) was used to evaluate die attach bleed issues with a silver-polymethylsilsesquioxane paste that did not contain either of an epoxy, or a thermoplastic component (i.e., a resin-free paste). Die attach parts were prepared in a manner that was similar to Example 5 using about 1.5 milligrams of the adhesive paste formulation on silver metallized alumina substrates, and processed at 200° C. using the thermal profile set forth in (a) of Example 4. As shown in FIG. 10, photographs of the die attach parts were taken following placement of the die (when the paste was still wet), and following processing (sintering) of the parts. The image of the parts following die placement in FIG. 10 shows a bleed ring of a liquid component spread out around the perimeter of the wet paste. The liquid component of the adhesive paste formulation 7 consisted of the vehicle only, which was considered to decompose/vaporize during the sintering process. The image of the processed parts showed no evidence of the bleed ring.

Bleed around die attach parts can be a serious problem for die attach pastes that contain a liquid resin, or organic components that can flow during processing to form a ring of material around the sintered die attach part. In particular, bleed around the die attach part becomes a problem when the die placement on the substrate or the circuit board is close, and the bleed zone interferes with the operation of the semiconductor device.

In the case of the silver-polymethylsilsesquioxane adhesive paste formulations 1 to 29 shown in Table 3 hereinabove, there are no epoxy, liquid resin, or thermoplastic components, and these adhesive paste formulations are considered to be "resin-free". The paste vehicle used in these formulations displayed an excellent burn-out during the sintering process, therefore, even though the vehicle may have shown some bleed, there were no visible signs of residual material in the bleed-ring following the thermal process. Vehicle components should be chosen carefully to ensure no residual material following the burn-out portion of die attach parts processing that might impact functional performance of the manufactured die attach part/device or package.

Example 11: High Performance Resin-Free Adhesives

High power devices require robust die attach adhesives that possess functional performance, including, for example, a high temperature stability (i.e., ≥225° C.), low-stress die attach bondlines, and a high thermal conductivity. While die attach adhesives exist that satisfy some of these requirements, it is challenging to find a commercially available adhesive that meets all of them.

Adhesive performance data for the resin-free adhesive paste formulations described hereinabove show promise for meeting all of the performance requirements for high power semiconductor devices. For example, functional properties of parts prepared with adhesive paste formulation 21 are shown in Table 3 hereinabove. The adhesive paste formulation 21 was prepared as described hereinabove in Example 1. Die shear test parts were prepared in the manner described in Example 5, by dispensing about 1.5 milligrams of the adhesive paste formulation onto a silver metallized alumina substrate; a 2.5 mm×2.5 mm gold metallized silicon die was used for die attach. Die attach parts were processed at 200° C., using the thermal profile set forth in (a) of Example 4.

The functional performance of parts prepared with paste formulation 21 is highlighted by the following:

(a) a storage modulus of 12.9 at −55° C., 12.0 GPa at 25° C. and 9.1 GPa at 200° C.;
(b) a coefficient of thermal expansion of $19.3 \times 10^{-6}$/K at 25° C. and $24.3 \times 10^{-6}$/K at 200° C.;
(c) a die shear strength of 40 MPa; and
(d) a 1-layer thermal conductivity of 103 W/mK.

The functional properties of this adhesive paste formulation showed excellent thermal stability, with a processing temperature of 200° C., and a minimal change in properties, such as storage modulus and coefficient of thermal expansion over a wide range of temperature.

The combination of moderate storage modulus values and low thermal expansion is desired for low-stress bondlines. Low-stress bond-lines coupled with excellent die shear strength are properties that are sought-after for the manufacture of high reliability die attach components and devices. This adhesive paste formulation also displayed excellent thermal conductivity, which is necessary to efficiently drain heat away from high power devices. The combined functional performance of this adhesive paste formulation makes it a good candidate for high power, high temperature die attach components or devices.

Example 12: Resin-Free Adhesive with Copolymer

Low storage modulus adhesives are desirable for large die attach applications, or die attach applications in which there is a large difference in the thermal expansion between the die and the substrate. While the use of polymethylsilsesquioxane fine powder in adhesive formulations results in decreased storage modulus, there are limitations. The use of copolymer additions, alone or in combination with polymethylsilses-quioxane, can further reduce the storage modulus of the adhesive. The adhesive paste formulations 17 and 18, having the compositions as set forth in Table 3 hereinabove, were prepared with copolymer only; the adhesive paste formulations 17 and 18 were prepared as described hereinabove in Example 1. Parts were prepared for functional testing in a manner described in Example 5. Die attach parts were prepared using about 1.5 milligrams of the paste onto a gold metallized alumina substrate; a 2.5 mm×2.5 mm gold metallized silicon die was used for die attach. Die attach parts were processed at 200° C., using the thermal profile set forth in (a) of Example 4.

The adhesive storage modulus decreased rapidly as the co-polymer content of the paste increased to 5 wt %, with storage modulus values of 3.3 GPa at 25° C. and 2.5 GPa at 200° C. measured for adhesive 17.

Example 13. Organic/Inorganic Thermally Conductive Adhesives

Organic/inorganic resin-type or sintering-type thermally conductive adhesives offer the advantage of manufacturing die attach parts, of which there is no metallization of the die or the substrate bonding surfaces. The use of bare (i.e., non-metallized) die and bare substrate components for semiconductor devices can reduce the manufacturing cost of the device, due to the added expense of metallization of die attach components.

The addition of a thermosetting resin and/or a thermoplastic resin component can be made to alter functional properties and application specific requirements for a device. For example, large die (e.g., 15 mm×15 mm) applications often require a thermosetting resin and/or a thermoplastic resin component to the adhesive paste formulation to obtain a uniform, void-free bondline microstructure.

Furthermore, a thermosetting resin and/or a thermoplastic resin may be added to improve adhesion when the sintering properties of the silver component are not sufficient to form strong intermetallic bonds with a metallized die and a metallized substrate component of the device.

The adhesive paste formulations set forth in Table 4 hereinabove, were prepared with an epoxy resin, a thermoplastic resin, or a combination of both resin component; the adhesive paste formulations were prepared as described hereinabove in Example 1. A wide range of paste formulations are provided, including formulations that contain individual silver components, such as nano-silver paste or silver powder, or a combination of said silver components.

As discussed hereinabove, a manufactured die attach part was prepared with adhesive paste formulation 46.

The adhesive paste formulation 46 contained a fairly low content of the epoxy and the thermoplastic component in order to achieve good thermal properties. Thermal conductivity and interfacial resistance (Rth) parts were prepared in the manner described in Example 5, and were processed at 200° C., using the thermal profile set forth in (a) of Example 4.

The adhesive paste formulation 46 showed a very good thermal conductivity of 62.1 W/mK, which exceeds the thermal conductivity value of about 57 W/mK for a gold-tin solder. In addition, interfacial bonding of the sintered adhesive with the die and the substrate components was excellent; wherein an interfacial resistance value of 0.012 $cm^2$K/W was measured for the die attach part.

Those of ordinary skill in the art will recognize that the epoxy and the thermoplastic content can be altered to adjust the adhesion/thermal functional properties of the manufactured part.

Example 14. Organic/Inorganic Thermally Conductive Adhesives for Non-metallized (Bare) Die and Substrates There are times when a non-metallized (bare) die and substrate are the preferred choice for device manufacture, where copper substrates are often used are used to assist with heat dissipation within the manufactured device. In addition, these types of devices can be sensitive to high temperature processing, and a lower processing temperature such as 175° C. is preferred.

Many organic/inorganic thermally conductive adhesives shown in Table 4 were processed at 175° C. and displayed excellent functional properties. Parts were prepared for functional testing in a manner described in Example 5; with the data provided in Table 4, hereinabove, for formulations 30 to 44. Die attach parts were prepared using about 1.5 milligrams of the paste onto a gold metallized alumina substrate; parts were processed at 175° C., using the thermal profile set forth in Example 4(b).

Additional parts were prepared to evaluate bonding to metallized and non-metallized copper leadframe substrates; parts were processed at 175° C., using the thermal profile set forth in Example 4(b). Bonding a silicon die to a copper leadframe substrate increases the adhesive bondline stress due to the large mismatch in thermal expansion between the die and substrate components. The die attach parts were subjected to a short thermal cycle test at +150° C. to −55° C. (for 46 cycles) to evaluate the stress-level at the adhesive bondline. Details of the die attach part construction, and die shear strength data are provided in Table 11.

TABLE 11

Thermal cycling test (+150° C./−55° C.) of formulation 40
die attach parts, fired to 175° C., bonded to metallized and
non-metallized die and substrate components
Paste Formulation 40 Die Attach Parts

| | Number of Thermal Cycles (+150° C./−55° C.) | |
| --- | --- | --- |
| | 0 | 46 |
| Die Shear Strength (MPa) 2 mm × 2 mm Si die on cooper leadframe | 9.5 | 9.5 |
| Die Shear Strength (MPa) 2 mm × 2 mm AuSi die on silver metallized cooper leadframe | 36 | 34 |

The die attach adhesion values for a metallized die and a metallized substrate part were excellent. The die attach adhesion value for the bare die and bare substrate device was moderate, but still showed acceptable adhesion. In both cases, the die attach parts showed excellent performance when exposed to thermal cycling at +150° C. to −55° C., which indicated acceptable stress levels at the adhesive bondline.

The invention claimed is:

1. A composition comprising:
   (a) 20 to 85 wt % of a thermally conductive silver component comprising silver nano-particles having a particle diameter of 5 to 500 nanometers;
   (b) a polyorganosilsesquioxane component selected from the group consisting of
      (i) 0.5 to 12 wt % of a polyorganosilsesquioxane fine powder,
      (ii) 0.5 to 8 wt % of a copolymer powder containing an interlacing polymer network of (I) a polyorganosilsesquioxane and (II) a polydiorganosiloxane, and
      (iii) 0.5 to 12 wt % of a combination of said polyorganosilsesquioxane fine powder and said copolymer powder; and
   (c) 3 to 12 wt % of a total solvent content in (i) one or more solvents or (ii) a vehicle containing one or more solvents.

2. The composition according to claim 1, wherein the polyorganosilsesquioxane component consists essentially of the polyorganosilsesquioxane fine powder, and the polyorganosilsesquioxane fine powder has a particle size of 0.8 micrometers to 20 micrometers.

3. The composition according to claim 1, wherein the polyorganosilsesquioxane component consists essentially of the copolymer powder, and the copolymer powder has a particle size of 2 micrometers to 50 micrometers.

4. The composition according to claim 1, wherein the thermally conductive silver component further comprises a component selected from the group consisting of (i) 20 to 70 wt % of a silver powder having a particle diameter of about 0.5 to 50 micrometers, (ii) copper particles having a diameter of about 0.5 to 50 micrometers and (iii) silver coated copper particles having a diameter of about 0.5 to 50 micrometers.

5. The composition according to claim 1, wherein the polyorganosilsesquioxane component consists essentially of the copolymer powder containing an interlacing polymer network of (I) a polyorganosilsesquioxane and (II) a polydiorganosiloxane.

6. The composition according to claim 1, wherein the polyorganosilsesquioxane component consists essentially of the combination of (i) the polyorganosilsesquioxane fine powder and (ii) the copolymer powder containing an interlacing polymer network of (I) a polyorganosilsesquioxane and (II) a polydiorganosiloxane.

7. The composition according to claim 2, wherein the polyorganosilsesquioxane fine powder is polymethylsilsesquioxane fine powder.

8. An article comprising a top bonding component, a substrate, and an adhesive which binds the top bonding component to the substrate, wherein the adhesive is the composition according to claim 1, wherein the top bonding component is selected from the group consisting of a ceramic die, a glass die, a metal die and a semiconductor die; and wherein the substrate is selected from the group consisting of a ceramic, copper, a copper alloy and a circuit board.

9. A composition comprising:
   (a) a thermally conductive silver component selected from the group consisting of (i) 0.5 to 85 wt % of silver nano-particles having a particle diameter of 5 to 500 nanometers, (ii) 0.5 to 86 wt % of silver particles having a diameter of about 0.5 to 50 micrometers and (iii) 60 to 85 wt % of a combination of said silver nano-particles and said silver particles;
   (b) a polyorganosilsesquioxane component selected from the group consisting of (i) 0.5 to 12 wt % of a polyorganosilsesquioxane fine powder, (ii) 0.5 to 8 wt % of a copolymer powder containing an interlacing polymer network of (I) a polyorganosilsesquioxane and (II) a polydiorganosiloxane, and (iii) 0.5 to 12 wt % of a combination of the polyorganosilsesquioxane fine powder and the copolymer powder;
   (c) 0.5 to 14 wt % of a resin selected from the group consisting of (i) a thermosetting resin component comprising a thermosetting resin, (ii) a thermoplastic resin and (iii) a combination of the thermosetting resin component and the thermoplastic resin; and
   (d) 3 to 12 wt % of a total solvent content in (i) one or more solvents or (ii) a vehicle containing one or more solvents.

10. The composition according to claim 9, wherein the polyorganosilsesquioxane component consists essentially of the polyorganosilsesquioxane fine powder, and the polyorganosilsesquioxane fine powder has a particle size of 0.8 micrometers to 20 micrometers.

11. The composition according to claim 10, wherein the polyorganosilsesquioxane fine powder is polymethylsilsesquioxane fine powder.

12. The composition according to claim 9, wherein the thermally conductive silver component comprises 65 to 86 wt % of silver particles having a diameter of about 0.5 to 5 micrometers.

13. The composition according to claim 9, wherein the thermally conductive silver component further comprises a component selected from the group consisting of (i) copper particles having a diameter of about 0.5 to 50 micrometers and (ii) silver coated copper particles having a diameter of about 0.5 to 50 micrometers.

14. An article comprising a top bonding component, a substrate, and an adhesive which binds the top bonding component to the substrate, wherein the adhesive is the composition according to claim 9, wherein the top bonding component is selected from the group consisting of a ceramic die, a glass die, a metal die and a semiconductor die; and wherein the substrate is selected from the group consisting of a ceramic, copper, a copper alloy and a circuit board.

15. A method for reducing the storage modulus of a thermally conductive adhesive containing silver and a first solvent, comprising blending said adhesive with a polyorganosilsesquioxane component selected from the group consisting of (i) 0.5 to 12 wt % of a polyorganosilsesquioxane fine powder, (ii) 0.5 to 8 wt % of a copolymer powder containing an interlacing polymer network of (I) a polyorganosilsesquioxane and (II) a polydiorganosiloxane, and (iii) 0.5 to 12 wt % of a combination of the polyorganosilsesquioxane fine powder and the copolymer powder,
  wherein the wt % of said polyorganosilsesquioxane component is based on the combined amounts of said adhesive and said polyorganosilsesquioxane component.

16. The method according to claim 15, wherein the thermally conductive adhesive is selected from the group consisting of a resin-type adhesive, a sintering-type adhesive and a silver-glass sintering-type adhesive.

17. The method according to claim 15, wherein the polyorganosilsesquioxane component is the polyorganosilsesquioxane fine powder, which is polymethylsilsesquioxane fine powder.

18. The method according to claim 15, wherein the polyorganosilsesquioxane component is the copolymer powder, which is an interlacing polymer network of polymethylsilsesquioxane and a polydimethylsiloxane.

19. The method according to claim 15, which further comprises adding a second solvent to adjust the rheology of the resultant adhesive, wherein the first solvent and the second solvent are the same or different.

20. An article comprising a top bonding component, a substrate and an adhesive which binds the top bonding component to the substrate, wherein the adhesive is the thermally conductive adhesive having a reduced storage modulus produced according to claim 15, wherein the top bonding component is selected from the group consisting of a ceramic die, a glass die, a metal die and a semiconductor die; and wherein the substrate is selected from the group consisting of a ceramic, copper, a copper alloy and a circuit board.

* * * * *